(12) United States Patent
Patel et al.

(10) Patent No.: US 7,953,190 B2
(45) Date of Patent: May 31, 2011

(54) PARALLEL PREAMBLE SEARCH ARCHITECTURES AND METHODS

(76) Inventors: Bhaskar Patel, San Clemente, CA (US); Arumugam Govindswamy, Irvine, CA (US)

( * ) Notice: Subject to any disclaimer, the term of this patent is extended or adjusted under 35 U.S.C. 154(b) by 603 days.

(21) Appl. No.: 12/151,114

(22) Filed: May 2, 2008

(65) Prior Publication Data

US 2008/0273634 A1 Nov. 6, 2008

Related U.S. Application Data

(60) Provisional application No. 60/927,172, filed on May 3, 2007.

(51) Int. Cl.
*H03D 1/00* (2006.01)
*H04L 27/06* (2006.01)

(52) U.S. Cl. ........ 375/343; 375/362; 375/365; 375/367; 375/368; 375/260; 370/210; 370/208

(58) Field of Classification Search .................. 375/343, 375/362, 365, 367, 368, 260; 370/210, 206
See application file for complete search history.

(56) References Cited

U.S. PATENT DOCUMENTS

| | | | | |
|---|---|---|---|---|
| 7,352,830 | B2 * | 4/2008 | Lewis | 375/343 |
| 2004/0005023 | A1 * | 1/2004 | Ham et al. | 375/368 |
| 2006/0114812 | A1 * | 6/2006 | Kim et al. | 370/206 |
| 2007/0025477 | A1 * | 2/2007 | Rasmussen | 375/343 |
| 2008/0165903 | A1 * | 7/2008 | Hooli et al. | 375/343 |
| 2010/0002573 | A1 * | 1/2010 | Baldemair et al. | 370/210 |

OTHER PUBLICATIONS

Cheng et al., "A Study on Cell Search Algorithms for IEEE 802.16e OFDMA Systems" © 2007 IEEE, p. 1850-1855.
Kim et al., "A Preamble-Based Cell Searching Technique for OFDM Cellular Systems" © 2003 IEEE, p. 2471-2475.
Lee et al., "Rapid Cell Search in OFDM-based cellular systems", © 2005 IEEE, 5 pages.
Zhou et al., "OFDMA Initial Ranging for IEEE 802.16e Based on Time-domain and Frequency-domain Approaches", 5 pages. (unknown date).

* cited by examiner

*Primary Examiner* — Phuong Phu
(74) *Attorney, Agent, or Firm* — Lerner, David, Littenberg, Krumholz & Mentlik, LLP

(57) ABSTRACT

The present invention provides architectures and methods which enables faster and more power efficient detection of channel parameters used by a communication system. Various parallel preamble correlator structures are able to perform searches for multiple preambles in parallel. The received samples are correlated with different delays between the samples corresponding to the different possible channel parameters that may be used by the communication system. Processing elements used in the preamble search may be shared among the parallel preamble search sections of a given architecture to reduce costs and power consumption. Decimation and filtering may also be used to reduce the interference from adjacent channels.

32 Claims, 20 Drawing Sheets

FIG. 4

| Number | RF Profile Name | Channel Bandwidth (MHz) | FFT Size | Center Frequency Step (KHz) | $F_{start}$ (MHz) | $N_{range}$ |
|---|---|---|---|---|---|---|
| 1 | Prof1.A_2.3 | 8.75 | 1024 | 250 | 2304.5 | {0, ..., 364} |
| 2 | Prof1.B_2.3-5 | 5.0 | 512 | 250 | 2302.5 | {0, ..., 380} |
|   | Prof1.B_2.3-10 | 10.0 | 1024 | 250 | 2305.0 | {0, ..., 360} |
| 3 | Prof2.A_2.305 | 3.5 | 512 | 250 | 2306.75 and 2346.75 | {0, ..., 46} |
| 4 | Prof2.B_2.305 | 5 | 512 | 250 | 2307.5 and 2347.5 | {0, ..., 46} |
| 5 | Prof2.C_2.305 | 10 | 1024 | 250 | 2310 and 2350 | {0, ..., 20} |
| 6 | Prof3.A_2.496 – 5 | 5 | 512 | 250 / 200 | 2498.5 | {0, ..., 756} |
|   | Prof3.A_2.496 – 10 | 10 | 1024 | 250 / 200 | 2501 | {0, ..., 736} |
| 7 | Prof4.A_3.3 | 5 | 512 | 250 | 3302.5 | {0, ..., 380} |
| 8 | Prof4.B_3.3 | 7 | 1024 | 250 | 3303.5 | {0, ..., 372} |
| 9 | Prof4.C_3.3 | 10 | 1024 | 250 | 3305 | {0, ..., 360} |
| 10 | Prof5.A_3.4 | 5 | 512 | 250 | 3402.5 | {0, ..., 1580} |
|   | Prof5L.A_3.4 | 5 | 512 | 250 |  | {0, ..., 780} |
|   | Prof5H.A_3.4 | 5 | 512 | 250 |  | {800, ..., 1580} |
| 11 | Prof5.B_3.4 | 7 | 1024 | 250 | 3403.5 | {0, ..., 1572} |
|   | Prof5L.B_3.4 | 7 | 1024 | 250 |  | {0, ..., 772} |
|   | Prof5H.B_3.4 | 7 | 1024 | 250 |  | {800, ..., 1572} |
| 12 | Prof5.C_3.4 | 10 | 1024 | 250 | 3405 | {0, ..., 1560} |
|   | Prof5L.C_3.4 | 10 | 1024 | 250 |  | {0, ..., 860} |
|   | Prof5H.C_3.4 | 10 | 1024 | 250 |  | {800, ..., 1560} |

FIG. 6

| Bandwidth (MHz) | Sampling Frequency $F_s$ (MHz) | $N_{FFT}$ | Symbol Duration $T_s$ (µs) | Number of samples | Repetition Interval (approx. samples) |
|---|---|---|---|---|---|
| 5 | 5.6 | 512 | 102.86 | 576 | 171 |
| 10 | 11.2 | 1024 | 102.86 | 1152 | 342 |
| 8.75 | 10 | 1024 | 115.20 | 1152 | 342 |
| 3.5 | 4 | 512 | 144.00 | 576 | 171 |
| 7 | 8 | 1024 | 144.00 | 1152 | 342 |

BW = 5 MHz, $N_{FFT}$ = 512

BW = 10 MHz, $N_{FFT}$ = 1024

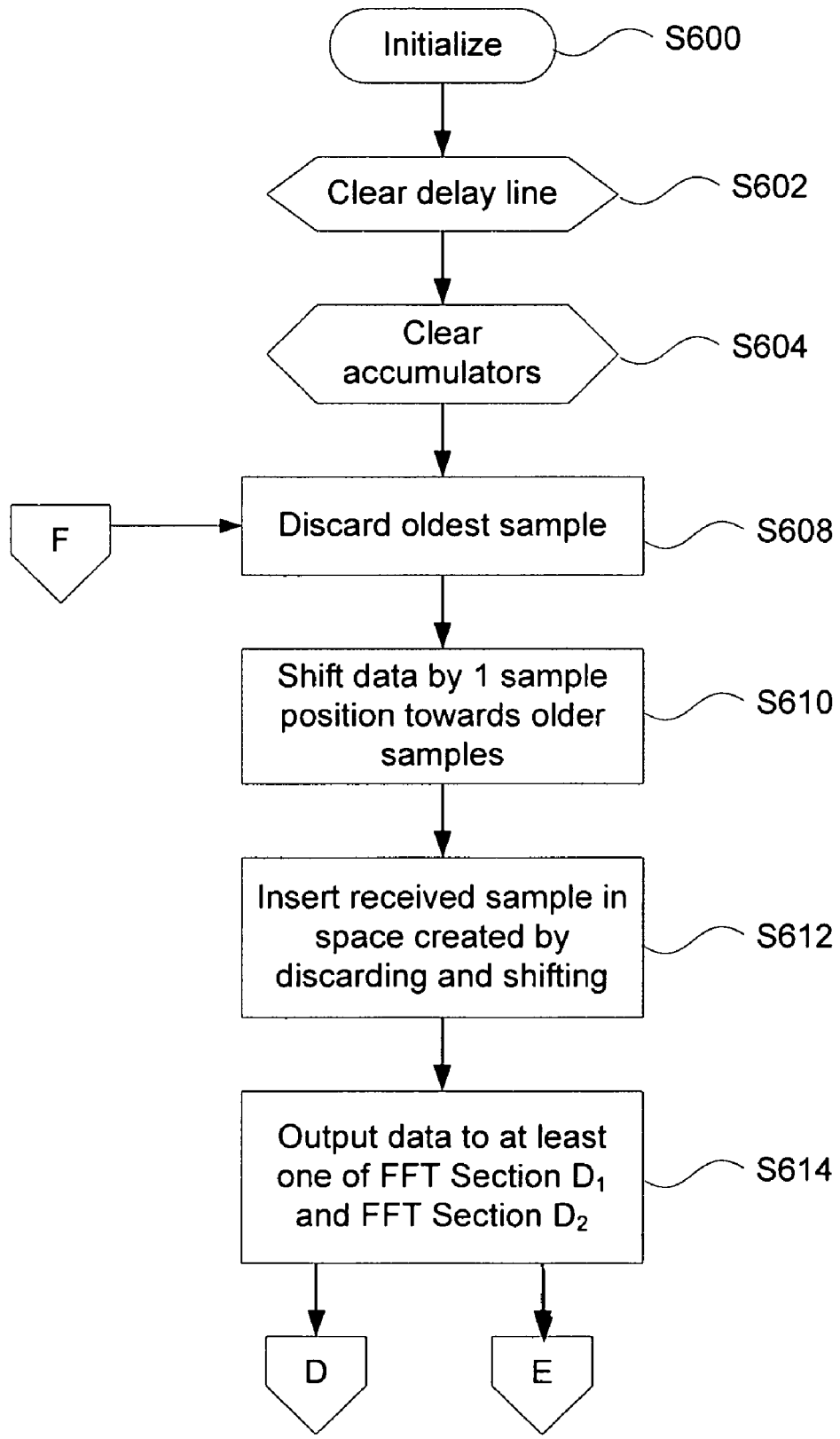

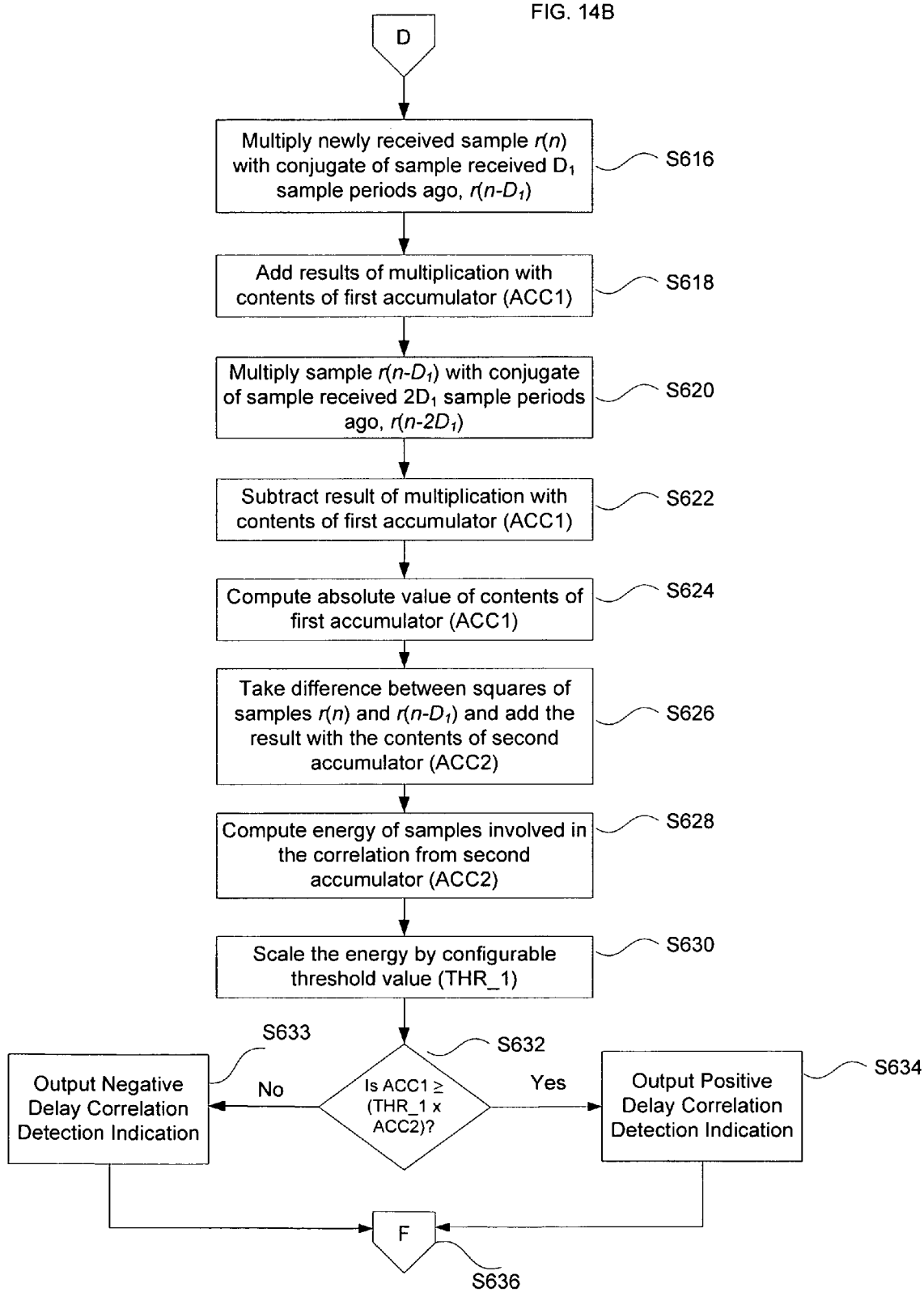

PARALLEL PREAMBLE SEARCH ARCHITECTURES AND METHODS

CROSS-REFERENCE TO RELATED APPLICATION

This application claims the benefit of U.S. Provisional Patent Application No. 60/927,172, filed May 3, 2007 and entitled "Parallel Preamble Search for FFT Size and Bandwidth Detection," the entire disclosure of which is hereby expressly incorporated by reference herein.

BACKGROUND OF THE INVENTION

1. Field of the Invention

The present invention relates generally to wireless communication systems and, more particularly, to mobile station receiver architectures and methods that employ detection and synchronization techniques.

2. Description of Related Art

A conventional wireless communication system may comprise elements such as a client terminal or mobile station ("MS") and multiple base stations ("BS"). FIG. 1 presents a wireless cellular communication system 10, which comprises elements such as MS 12 and BSs 14. Other network devices which may be employed, such as a mobile switching center, are not shown. The communication path from a given BS 14 such as the "serving base station" to the MS 12 is referred to herein as the downlink ("DL") and the communication path from the MS 12 to a base station 14 is referred to herein as the uplink ("UL").

As shown in FIG. 2, the MS 12 typically includes a baseband subsystem and a radio frequency ("RF") subsystem. Memory, such as an external memory 20, is shown connected to the baseband subsystem. The baseband subsystem normally consists of a micro controller unit ("MCU"), a signal processing unit ("SPU"), data converters, peripherals, power management, and memory as shown in FIG. 3. The SPU may be a digital signal processor ("DSP"), hardware ("HW") accelerators, co-processors or a combination of the above. Normally the overall control of the baseband subsystem is performed by software running on the MCU and the processing of signals is done by the SPU.

The radio frequency spectrum is the precious resource and it is limited. Conventional wireless communication systems may operate in different radio frequency bands for different markets. Normally, for a given wireless communication system, the radio frequency band is divided into multiple channels. To meet the requirements of different markets and to efficiently use the limited radio frequency spectrum, many deployed wireless communication systems are designed to allow the scalability and flexibility of operating it in different frequency bands using different channel bandwidths.

The combination of frequency band of operation, channel bandwidth, and other parameters is collectively referred as a radio profile of the wireless communication network. A wireless communication network may have multiple radio profiles. To support this flexibility in wireless communication networks, MSs should be able to dynamically detect radio profiles available for service.

A wireless communication system may be deployed in one geographic area with one radio profile while the same system may be deployed in different geographic area with different radio profile. The MSs in these systems do not have a priori knowledge about the actual radio profile being used by the system. An MS in these systems needs to determine the actual radio profile being used by the system. The determination of radio profile typically needs to be done under different circumstances.

In order to understand some of the issues and tradeoffs involved, an example is now provided for a wireless communication system in accordance with the IEEE 802.16e standard. This standard includes an Orthogonal Frequency Division Multiple Access ("OFDMA") based physical layer, which can use any of the radio profiles listed in the table of FIG. 4. A number of different radio profiles are shown, with each given an RF profile name. The channel bandwidth, Fast Fourier Transform ("FFT") size, center frequency step, start frequency ($F_{start}$) and range or number of channel positions ($N_{range}$) are also listed. While additional profiles may be added, important attributes of the radio profiles of IEEE 802.16e system are the frequency band of operation, the channel bandwidth being used and the FFT size being used. FFT is used interchangeably herein with FFT size.

Normally detecting the radio profile involves several steps. First, the frequency band of operation is identified. This typically can be determined by signal level measurements in all frequency bands supported by the wireless communication system and the client terminal. The next step of the radio profile detection involves finding the exact location of the channel within a frequency band for a given bandwidth. Note that for each profile, there are hundreds of channel positions as shown in FIG. 4. The fine resolution in channel position for a given frequency band allows deployment flexibility. For example, the profile Prof1.A_2.3 in FIG. 4 contains a total of 365 (0, . . . , 364) channel positions even though there may be at most 10 actual channels that can be deployed in that frequency band. The MS considers all the positions when detecting the radio profile in a worst case scenario.

The process of detecting the radio profile in known systems is implemented in an exhaustive manner where every possible combination is tried sequentially until the radio profile used by the wireless communication networks are detected successfully. For the chosen example, assuming the frequency band of operation is identified as 2.3 GHz, the possible radio profiles are numbers 1 through 5 in FIG. 4. For this frequency band there are four possible channel bandwidths (3.5 MHz, 5.0 MHz, 8.75 MHz and 10.0 MHz) and two different FFT sizes (512 and 1024).

For each channel position the MS or client terminal must detect the correct channel bandwidth and FFT pair. In one possible implementation of radio profile detection, a client terminal may first attempt to detect radio profile 1 using 8.75 MHz channel bandwidth with 1024 FFT and may need to search for all 365 channel positions. If the radio profile detection is not successful, the client terminal may attempt to detect a radio profile 2 using 5 MHz channel bandwidth with 512 FFT and may need to search for all channel positions and this process continues for all radio profiles 1 through 5 for that frequency band.

In another possible implementation of radio profile detection, a client terminal may first attempt to detect a radio profile for a given channel position. In this case for a given channel position all the allowed channel bandwidth and the FFT pair is searched for. The possible channel bandwidth and the FFT pair are 8.75 MHz channel bandwidth with 1024 FFT pair or 5 MHz channel bandwidth with 512 FFT pair or 10 MHz channel bandwidth with 1024 FFT pair or 3.5 MHz channel bandwidth with 512 FFT pair. If the radio profile detection is not successful for the channel position, the client terminal may attempt to detect the radio profile for the next channel position. As these scenarios illustrate, the process of detecting the radio profile becomes much more processing intensive due to large number of possible combinations.

It should be understood that the exhaustive approach for radio profile detection has several major disadvantages. For instance, it may take a long time to detect the radio profile. And such detection may consume significant power in the MS as the processing is intensive.

Furthermore, a radio profile may need to be detected at different scenarios. These include when the client terminal powers on, when the client terminal is looking for network service, when the client terminal roaming to a new service area, etc. Often the client terminals for IEEE 802.16e are battery operated devices. Thus, another issue of concern is power consumption by such devices.

SUMMARY OF THE INVENTION

In accordance with aspects of the present invention, methods and apparatuses employing parallel architecture to perform search and detection of radio profiles for wireless communication systems, such as an OFDMA based physical layer IEEE 802.16e wireless communication system, are described. As will be seen, reduced processing, faster detection and lower power consumption may be achieved. The OFDMA based physical layer of the IEEE 802.16e wireless communication architecture is used as an example to illustrate aspects the invention. However aspects of the invention can be applied to any wireless communication systems if applicable.

In accordance with an embodiment of the present invention, a mobile station having a parallel sliding window correlator apparatus for preamble searching in a wireless network comprises a delay line device, a first FFT section and a second FFT section. During operation, the delay line device receives an input signal representative of a received signal from the wireless network. It provides a plurality of outputs including a first output r(n), a second output r(n–D), a third output r(n–2D), a first filtered output $r_2(m)$, a second filtered output $r_2(m-D/2)$ and a third filtered output $r_2$ (m–D).

The first FFT section is coupled to the delay line device and receives the first output, the second output and the third output. The first FFT section includes a plurality of nodes for processing the first, second and third outputs. A first one of the plurality of nodes of the first FFT section obtains a first correlation magnitude signal, a second one of the plurality of nodes obtains a first energy level signal corresponding to a first energy level of the received signal, a third one of the plurality of nodes scales the first energy level signal by a predetermined first threshold to obtain a first scaled signal, and a fourth one of the plurality of nodes takes the difference between the first correlation magnitude signal and the first scaled signal to generate a first delay correlation detection indication signal.

The second FFT section is also coupled to the delay line device and receives the first filtered output, the second filtered output and the third filtered output. The second FFT section includes a plurality of nodes for processing the first, second and third filtered outputs. A first one of the plurality of nodes of the second FFT section obtains a second correlation magnitude signal, a second one of the plurality of nodes obtains a second energy level signal corresponding to a second energy level of the received signal, a third one of the plurality of nodes scales the second energy level signal by a predetermined second threshold to obtain a scaled signal, and a fourth one of the plurality of nodes takes the difference between the second correlation magnitude signal and the second scaled signal to generate a second delay correlation detection indication signal.

In this embodiment, the first FFT section is an N-size FFT section and the second FFT section is an N/2 size FFT section. The N-size FFT section searches for a first preamble associated with a first channel bandwidth and the N/2 size FFT section searches for a second preamble associated with a second channel bandwidth. Processing to obtain the first and second delay correlation detection indication signals is performed in parallel.

In one example, the first threshold corresponds to a ratio of the first correlation magnitude signal and the first energy level signal, and the second threshold corresponds to a ratio of the second correlation magnitude signal and the second energy level signal.

In another example, the first channel bandwidth is an integral multiple of the second channel bandwidth. In this case, a sampling rate for the first channel bandwidth may be an integral multiple of a sampling rate of the second channel bandwidth.

In a further example, the delay line device includes a decimation filter to reduce a sampling rate or filter out unwanted signals to generate the first, second and third filtered outputs. Here, coefficients of the decimation filter may be obtained dynamically depending on the first and second channel bandwidths and the sampling rate.

In an alternative, the first FFT section further includes nodes for squaring the first and second outputs and the second node of the first FFT section subtracts the squared second output from the squared first output, and the second FFT section further includes nodes for squaring the first and second filtered outputs and the second node of the second FFT section subtracts the squared second filtered output from the squared first filtered output.

In this case, the first and second FFT sections may include additional nodes. For instance, the first FFT section may further include a fifth node for multiplying the first output with a conjugate of the second output, a sixth node for multiplying the second output with a conjugate of the third output, and a seventh node for subtracting a signal received from the sixth node from a signal received from the fifth node and outputting a first resultant signal. And the second FFT section may further include a fifth node for multiplying the first filtered output with a conjugate of the second filtered output, a sixth node for multiplying the second filtered output with a conjugate of the third filtered output, and a seventh node for subtracting a signal received from the sixth node from a signal received from the fifth node and for outputting a second resultant signal. Here, the first correlation magnitude may be obtained by taking an absolute value of the first resultant signal and the second correlation magnitude may be obtained by taking an absolute value of the second resultant signal.

In accordance with another embodiment of the present invention, a mobile station having a parallel sliding window correlator apparatus for preamble searching in a wireless network may be provided. The mobile station may comprise a delay line device, a first FFT section and a second FFT section.

During operation, the delay line device receives an input signal representative of a received signal from the wireless network. The delay line device provide a plurality of outputs including a first output r(n), a second output $r(n-D_1)$, a third output $r(n-2D_1)$, a fourth output $r(n-D_2)$ and a fifth output $r(n-2D_2)$. $D_1$ is a first distance between repeating sections of the input signal and $D_2$ is a second distance between repeating sections of the input signal.

The first FFT section is coupled to the delay line device and receives the first output, the second output and the third output. The first FFT section includes a plurality of nodes for processing the first, second and third outputs. A first one of the plurality of nodes of the first FFT section obtains a first correlation magnitude signal. A second one of the plurality of nodes obtains a first energy level signal corresponding to a first energy level of the received signal. A third one of the plurality of nodes scales the first energy level signal by a predetermined first threshold to obtain a first scaled signal. And a fourth one of the plurality of nodes takes the difference between the first correlation magnitude signal and the first scaled signal to generate a first delay correlation detection indication signal.

The second FFT section is also coupled to the delay line device and receiving the first output, the fourth output and the fifth output. The second FFT section includes a plurality of nodes for processing the first, fourth and fifth outputs. A first one of the plurality of nodes of the second FFT section obtains a second correlation magnitude signal, a second one of the plurality of nodes obtains a second energy level signal corresponding to a second energy level of the received signal. A third one of the plurality of nodes scales the second energy level signal by a predetermined second threshold to obtain a scaled signal. And a fourth one of the plurality of nodes takes the difference between the second correlation magnitude signal and the second scaled signal to generate a second delay correlation detection indication signal.

Here, the first FFT section is an N-size FFT section and the second FFT section is also an N-size FFT section. The first FFT section searches for a first preamble associated with a first channel bandwidth and the second FFT section searches for a second preamble associated with a second channel bandwidth. Processing to obtain the first and second delay correlation detection indication signals is performed in parallel.

In an alternative, the first FFT section may further include nodes for squaring the first and second outputs and the second node of the first FFT section subtracts the squared second output from the squared first output, and the second FFT section may further include nodes for squaring the first and fourth outputs and the second node of the second FFT section subtracts the squared fourth output from the squared first output.

Here, the first FFT section may further include a fifth node for multiplying the first output with a conjugate of the second output, a sixth node for multiplying the second output with a conjugate of the third output, and a seventh node for subtracting a signal received from the sixth node from a signal received from the fifth node and outputting a first resultant signal, and the second FFT section may further include a fifth node for multiplying the first output with a conjugate of the fourth output, a sixth node for multiplying the fourth output with a conjugate of the fifth output, and a seventh node for subtracting a signal received from the sixth node from a signal received from the fifth node and for outputting a second resultant signal.

In this scenario, the first correlation magnitude may be obtained by taking an absolute value of the first resultant signal and the second correlation magnitude may be obtained by taking an absolute value of the second resultant signal.

In accordance with yet another embodiment of the present invention, a mobile station having a parallel sliding window correlator apparatus for preamble searching in a wireless network comprises delay mean, first FFT means and second FFT means. The delay means is for receiving an input signal representative of a received signal from the wireless network and for providing a plurality of outputs. The first FFT means is operatively coupled to the delay means for obtaining a first correlation magnitude signal, for obtaining a first energy level signal corresponding to a first energy level of the received signal, for scaling the first energy level signal by a predetermined first threshold to obtain a first scaled signal, and for taking the difference between the first correlation magnitude signal and the first scaled signal to generate a first delay correlation detection indication signal. And the second FFT means is operatively coupled to the delay means for obtaining a second correlation magnitude signal, for obtaining a second energy level signal corresponding to a second energy level of the received signal, for scaling the second energy level signal by a predetermined second threshold to obtain a second scaled signal, and for taking the difference between the second correlation magnitude signal and the second scaled signal to generate a second delay correlation detection indication signal. The first FFT means searches for a first preamble associated with a first channel bandwidth and the second FFT means searches for a second preamble associated with a second channel bandwidth. Furthermore, the first and second FFT means operate in parallel.

In an alternative, the first FFT means operates on an N-size FFT and the second FFT means operates on an N/2 size FFT. In another alternative, the first FFT means operates on an N-size FFT and the second FFT means operates on the N-size FFT.

In yet further alternative, a third FFT means is operatively coupled to the delay means for obtaining a third correlation magnitude signal, for obtaining a third energy level signal corresponding to a third energy level of the received signal, for scaling the third energy level signal by a predetermined third threshold to obtain a third scaled signal, and for taking the difference between the third correlation magnitude signal and the third scaled signal to generate a third delay correlation detection indication signal. The third FFT means operates in parallel with the first and second FFT means.

In an example, the first FFT means operates on a first distance between repeating sections of the input signal, the second FFT means operates on a second distance between repeating sections of the input signal, and the third FFT means operates on decimated and filtered versions of the input signal.

In accordance with another embodiment of the present invention, a mobile station having a sliding window correlator apparatus for preamble searching in a wireless network comprising a delay line device, a first FFT section and a second FFT section. The delay line device is for receiving an input signal representative of a received signal from the wireless network. The delay line device provides a plurality of outputs including a first output r(n), a second output r(n–$N_{cp1}$), a third output r(n–$N_1$), a fourth output r(n–$N_1$–$N_{CP1}$), a fifth output r(n–$N_{CP2}$), a sixth output r(n–$N_2$) and a seventh output r(n–$N_2$–$N_{CP2}$). $N_1$ is a first distance between repeating sections of the input signal and $N_2$ is a second distance between repeating sections of the input signal.

The first FFT section is coupled to the delay line device and receives the first output, the second output, the third output and the fourth output. The first FFT section includes a plurality of nodes for processing the first, second, third and fourth output signals. A first one of the plurality of nodes of the first FFT section obtains a first correlation magnitude signal, a second one of the plurality of nodes for obtains a first energy level signal corresponding to a first energy level of the received signal, a third one of the plurality of nodes scales the first energy level signal by a predetermined first threshold to obtain a first scaled signal, and a fourth one of the plurality of nodes takes the difference between the first correlation magnitude signal and the first scaled signal to generate a first CP correlation detection indication signal.

The second FFT section includes a plurality of nodes for processing the first, fifth, sixth and seventh outputs. A first one of the plurality of nodes of the second FFT section obtains a second correlation magnitude signal, a second one of the plurality of nodes obtains a second energy level signal corresponding to a second energy level of the received signal, a third one of the plurality of nodes scales the second energy level signal by a predetermined second threshold to obtain a second scaled signal, and a fourth one of the plurality of nodes takes the difference between the second correlation magnitude signal and the second scaled signal to generate a second CP correlation detection indication signal.

The first FFT section is an N-size FFT section and the second FFT section is also an N-size FFT section. The first FFT section searches for a first preamble associated with a first channel bandwidth and the second FFT section searches for a second preamble associated with a second channel bandwidth. Processing to obtain the first and second delay correlation detection indication signals is performed in parallel.

In one example, the first FFT section further includes nodes for squaring the first and second outputs and the second node of the first FFT section subtracts the squared second output from the squared first output, and the second FFT section further includes nodes for squaring the first and fifth outputs and the second node of the second FFT section subtracts the squared fifth output from the squared first output.

In this case, the first FFT section may further include a fifth node for multiplying the first output with a conjugate of the third output, a sixth node for multiplying the second output with a conjugate of the fourth output, and a seventh node for subtracting a signal received from the sixth node from a signal received from the fifth node and outputting a first resultant signal. The second FFT section may further include a fifth node for multiplying the first output with a conjugate of the sixth output, a sixth node for multiplying the fifth output with a conjugate of the seventh output, and a seventh node for subtracting a signal received from the sixth node from a signal received from the fifth node and outputting a second resultant signal.

Here, the first correlation magnitude may be obtained by taking an absolute value of the first resultant signal and the second correlation magnitude may be obtained by taking an absolute value of the second resultant signal.

In accordance with yet another embodiment of the present invention, a method of preamble searching by a mobile station in a wireless network is provided. The method comprises, in a first processing section of the mobile station: generating a first correlation magnitude signal; generating a first energy level signal corresponding to a first energy level of the received signal; scaling the first energy level signal by a predetermined first threshold to obtain a first scaled signal; and generating a first delay correlation detection indication signal by taking the difference between the first correlation magnitude signal and the first scaled signal. And in a second processing section of the mobile station, the method includes: generating a second correlation magnitude signal; generating a second energy level signal corresponding to a second energy level of the received signal; scaling the second energy level signal by a predetermined second threshold to obtain a second scaled signal; and generating a second delay correlation detection indication signal by taking the difference between the second correlation magnitude signal and the second scaled signal. The first processing section searches for a first preamble associated with a first channel bandwidth and the second processing section searches for a second preamble associated with a second channel bandwidth, and the first and second processing sections operate in parallel.

In one example, the first processing section operates on an N-size FFT and the second processing section operates on an N/2 size FFT. In another example, the first processing section operates on an N-size FFT and the second processing section operates on the N-size size FFT.

In one alternative, the method further comprises receiving an input signal representative of a received signal from the wireless network in a delay line device; the delay line device providing a plurality of outputs based upon the received input signal, including a first output r(n), a second output r(n–D), a third output r(n–2D), a first filtered output $r_2$ (m), a second filtered output $r_2$ (m–D/2) and a third filtered output $r_2$ (m–D); in the first processing section, obtaining the first energy level signal by squaring the first and second outputs and taking the difference between the squares of the first and second outputs; in the second processing section, obtaining the second energy level signal by squaring the first and second filtered outputs and taking the difference between the squares of the first and second outputs; in the first processing section, obtaining the first correlation magnitude signal by: multiplying the first output by a conjugate of the second output to obtain a first multiplied signal; multiplying the second output by a conjugate of the third output to obtain a second multiplied signal; and subtracting the second multiplied signal from the first multiplied signal; in the second processing section, obtaining the second correlation magnitude signal by: multiplying the first filtered output by a conjugate of the second filtered output to obtain a first multiplied signal; multiplying the second filtered output by a conjugate of the third filtered output to obtain a second multiplied signal; and subtracting the second multiplied signal from the first multiplied signal.

In another alternative, the method further comprises: scaling the first energy level signal by a first predetermined threshold value; scaling the second energy level signal by second a predetermined threshold value; if the first correlation magnitude signal is greater than or equal to the scaled first energy level signal, then outputting a positive first delay correlation detection indication signal; if the first correlation magnitude signal is less then the scaled first energy level signal, then outputting a negative first delay correlation detection indication signal; if the second correlation magnitude signal is greater than or equal to the scaled second energy level signal, then outputting a positive second delay correlation detection indication signal; and if the second correlation magnitude signal is less then the scaled second energy level signal, then outputting a negative second delay correlation detection indication signal.

In yet another alternative, the method further comprises: receiving an input signal representative of a received signal from the wireless network in a delay line device; the delay line device providing a plurality of outputs based upon the received input signal, including a first output r(n), a second output r(n–$D_1$), a third output r(n–2$D_1$), a fourth output r(n–$D_2$) and a fifth output r(n–2$D_2$); in the first processing section, obtaining the first energy level signal by squaring the first and second outputs and taking the difference between the squares of the first and second outputs; in the second processing section, obtaining the second energy level signal by squaring the first and fourth outputs and taking the difference between the squares of the first and fourth outputs; in the first processing section, obtaining the first correlation magnitude signal by: multiplying the first output by a conjugate of the second output to obtain a first multiplied signal; multiplying the second output by a conjugate of the third output to obtain a second multiplied signal; and subtracting the second multiplied signal from the first multiplied signal; in the second processing section, obtaining the second correlation magnitude signal by: multiplying the first output by a conjugate of the fourth output to obtain a first multiplied signal; multiplying the fourth output by a conjugate of the fifth output to obtain a second multiplied signal; and subtracting the second multiplied signal from the first multiplied signal.

In this case, the method may further comprise: scaling the first energy level signal by a first predetermined threshold value; scaling the second energy level signal by second a predetermined threshold value; if the first correlation magnitude signal is greater than or equal to the scaled first energy level signal, then outputting a positive first delay correlation detection indication signal; if the first correlation magnitude signal is less then the scaled first energy level signal, then outputting a negative first delay correlation detection indication signal; if the second correlation magnitude signal is greater than or equal to the scaled second energy level signal, then outputting a positive second delay correlation detection indication signal; and if the second correlation magnitude signal is less then the scaled second energy level signal, then outputting a negative second delay correlation detection indication signal.

In accordance with a further embodiment of the present invention, a method of preamble searching by a mobile station in a wireless network comprises: providing a delay line device for receiving an input signal representative of a received signal from the wireless network; the delay line device generating a plurality of outputs including a first output $r(n)$, a second output $r(n-N_{cp1})$, a third output $r(n-N_1)$, a fourth output $r(n-N_1-N_{CP1})$, a fifth output $r(n-N_{CP2})$, a sixth output $r(n-N_2)$ and a seventh output $r(n-N_2-N_{CP2})$, wherein $N_1$ is a first distance between repeating sections of the input signal and $N_2$ is a second distance between repeating sections of the input signal; receiving the first output, the second output, the third output and the fourth output at a first FFT section, the first FFT section: obtaining a first correlation magnitude signal; obtaining a first energy level signal corresponding to a first energy level of the received signal; scaling the first energy level signal by a predetermined first threshold to obtain a first scaled signal; and taking the difference between the first correlation magnitude signal and the first scaled signal to generate a first CP correlation detection indication signal; receiving the first, fifth, sixth and seventh outputs at a second FFT section, the second FFT section: obtaining a second correlation magnitude signal; obtaining a second energy level signal corresponding to a first energy level of the received signal; scaling the second energy level signal by a predetermined second threshold to obtain a second scaled signal; and taking the difference between the second correlation magnitude signal and the second scaled signal to generate a second CP correlation detection indication signal.

In one example, the first FFT section is an N-size FFT section and the second FFT section is also an N size FFT section, and the first FFT section searches for a first preamble associated with a first channel bandwidth and the second FFT section searches for a second preamble associated with a second channel bandwidth.

In another example, the first and second FFT sections operate in parallel to generate the first and second CP correlation detection indication signals.

BRIEF DESCRIPTION OF THE DRAWINGS

FIG. 4 is a table illustrating exemplary RF profiles for an OFDM system.

FIG. 6 is a table illustrating OFDM symbol parameters for different channel bandwidths and FFT sizes.

FIGS. 14A-C illustrate another parallel sliding window correlator process in accordance with aspects of the present invention.

DETAILED DESCRIPTION

Figure 1:
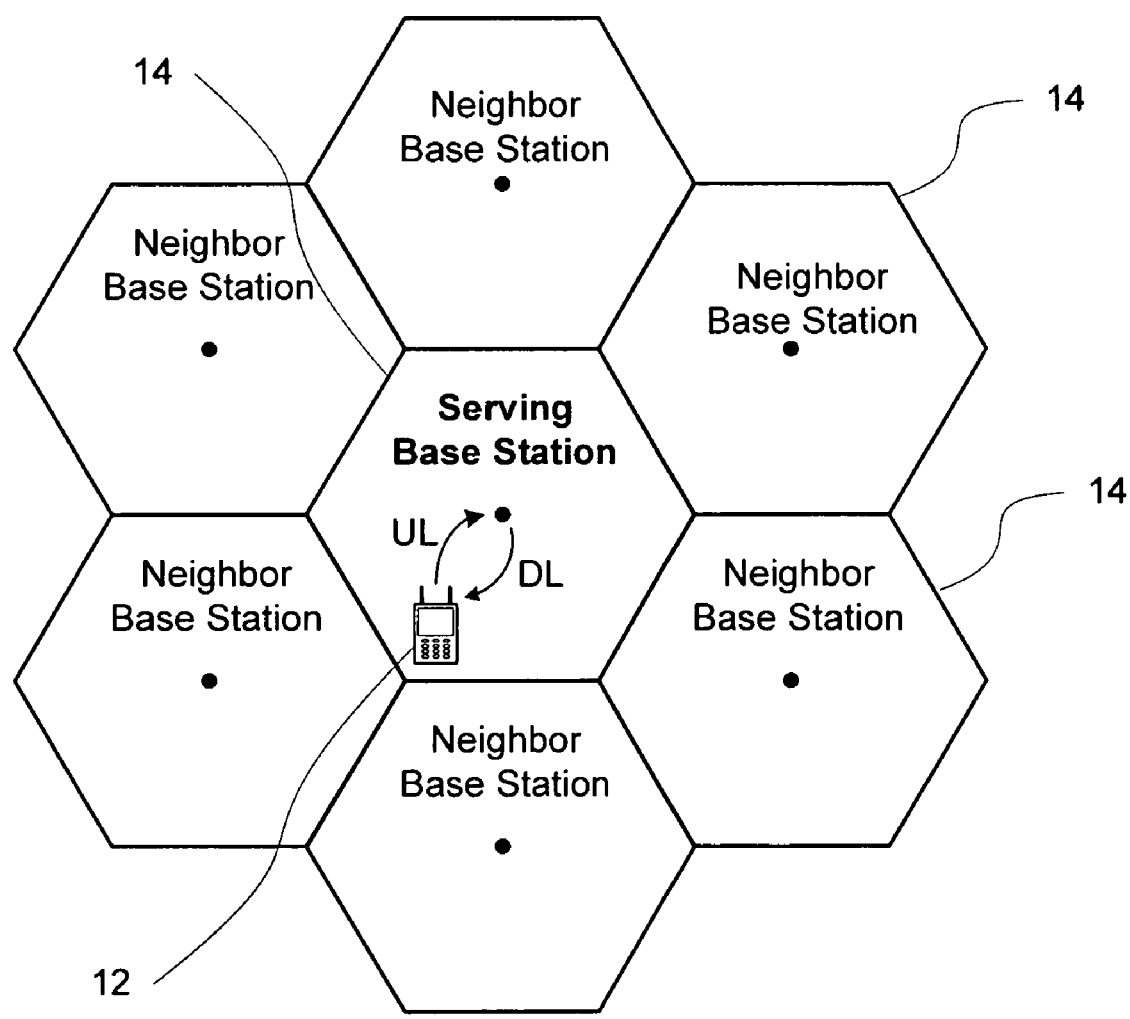
FIG. 1 illustrates a conventional wireless cellular communication system.
Figure 2:
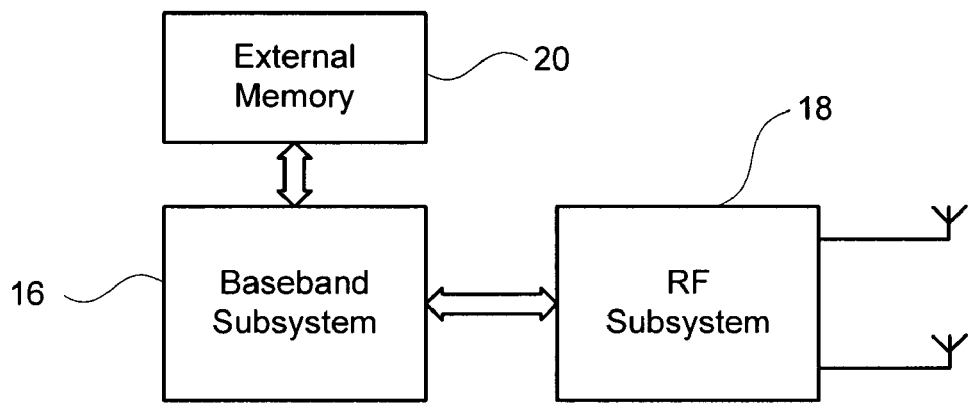
FIG. 2 illustrates a wireless mobile station diagram.
Figure 3:
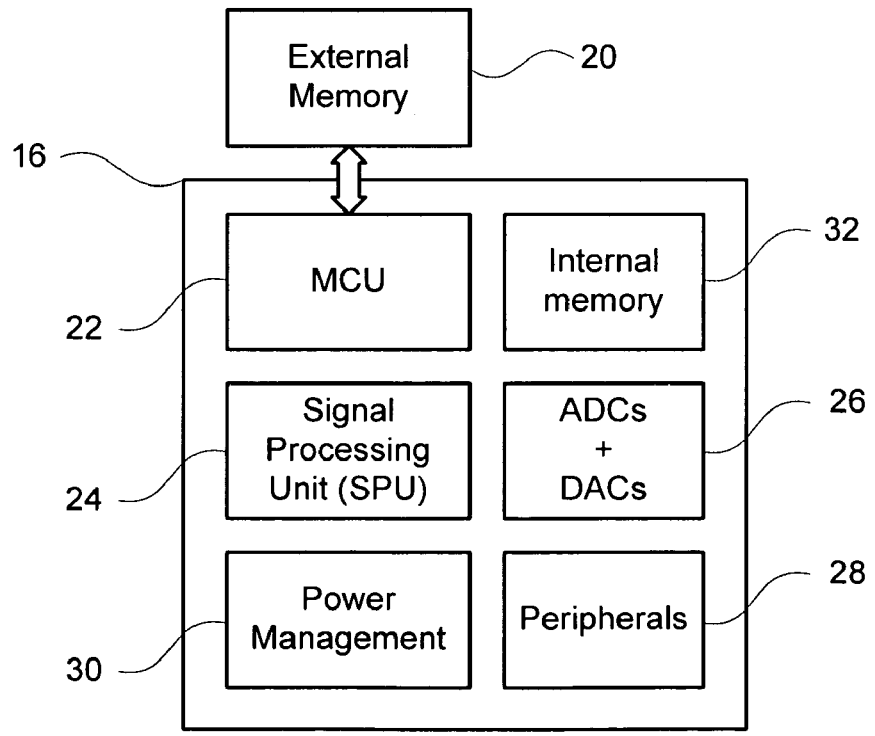
FIG. 3 illustrates a baseband subsystem for a wireless mobile station.

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the invention is not intended to be limited to the specific terms used.

Radio profile detection for a given wireless communication system may include channel bandwidth and FFT detection processes. In many cases, power measurement may also be undertaken. For instance, power measurement may be conducted for transmitters such as serving and neighboring base stations. The power measurement portion of the radio profile detection process may be performed using techniques well known in the industry.

Many wireless communication systems transmit a beacon signal for client terminals to detect and synchronize to the system. A fixed pattern or Pseudorandom Noise ("PN") sequence modulated signal is often used as a type of beacon signal that can be used for detection and synchronization purposes. The beacon signals are often referred to as the preamble or synchronization signal. For instance, the beacon signal for IEEE 802.16e is referred to as the preamble.

Typically, the preamble signal is designed with certain properties to allow for efficient detection. For instance, in the IEEE 802.16e OFDMA physical layer, preambles are used for detection, synchronization and channel estimation and to detect the radio profile.

Several steps may be involved in detecting the radio profiles. For instance, one step may be to identify the frequency bands in which the wireless communication networks operates. This task may be accomplished using power measurements in all the possible frequency bands supported by the networks and the client terminal. Selecting the frequency bands may be based on measured signal strength and/or other criteria such as some a priori information, including a previous successful radio profile detection(s) which may be stored in non-volatile memory of the MS.

Another step may be to identify the channel bandwidth and its associated FFT size. To facilitate detection of channel bandwidth and its associated FFT size, the preamble is used in IEEE 802.16e wireless communication system. Detecting the preamble results in the radio profile determination of the wireless communication system.

In the IEEE 802.16e wireless communication systems, the preambles are different for different FFT sizes. However, the preamble signal exhibits certain properties that are common to all FFT sizes and can be exploited in the detection of the preamble and therefore the detection of the radio profile.

It has been found that channel bandwidth detection typically cannot be performed reliably just based on power measurements. For example, two adjacent 5 MHz channels may be misinterpreted as a single 10 MHz channel and vice versa. Therefore, in accordance with aspects of the present invention, additional processing may be performed to correctly identify the channel bandwidth used by the wireless communication system. For instance, detection of the preamble provides a highly reliable indicator of the FFT size and the channel bandwidth being used by the wireless communication system.

As may be seen from the chart in FIG. 4, certain relationship exists between the channel bandwidth and the FFT size used by a system. For example, a 5 MHz channel bandwidth may always use a 512 FFT size while 10 MHz channels may always use a 1024 FFT size. Similarly, a 3.5 MHz channel may always use a 512 FFT size and a 7 MHz channel may always use a 1024 FFT size. These relationships may be used in parallel detection of a preamble of two or more sizes at the same time.

In the IEEE 802.16e OFDMA based physical layer wireless communication system, each OFDM symbol is constructed by a set of sub-carriers. Each subcarrier is modulated by user payload information using traditional modulation techniques such as BPSK, QPSK, 16-QAM, 64-QAM, etc. Some subcarriers may be zeroed out. The total number of sub-carriers in an OFDM symbol is equal to the FFT size. The sub-carriers in frequency domain are converted to time domain by performing an inverse FFT ("IFFT") operation.

In an OFDM symbol, a certain number of samples may be copied from the end part to the beginning of the same symbol. This is referred to herein as the cyclic prefix ("CP"). The CP may be used to avoid inter-symbol interference ("ISI") and to combat multipath propagation. The CP length may or may not be known in advance but is usually expressed as a fraction of the FFT size being used.

IEEE 802.16e OFDMA based wireless communication systems typically use a preamble at the beginning of each frame to help the receiver achieve timing and frequency synchronization. The structure of the preamble is such that, in frequency domain, the preamble PN code modulates every third subcarrier among all the available data subcarriers using BPSK. The two unused subcarriers between two modulated subcarriers by a particular preamble code are zeroed out. Different cells within a network may use different PN codes to modulate the used subcarriers. The frequency domain preamble signal is converted to time domain by performing an IFFT. And a CP is added in a same manner as that of any OFDM symbol.

Figure 5:
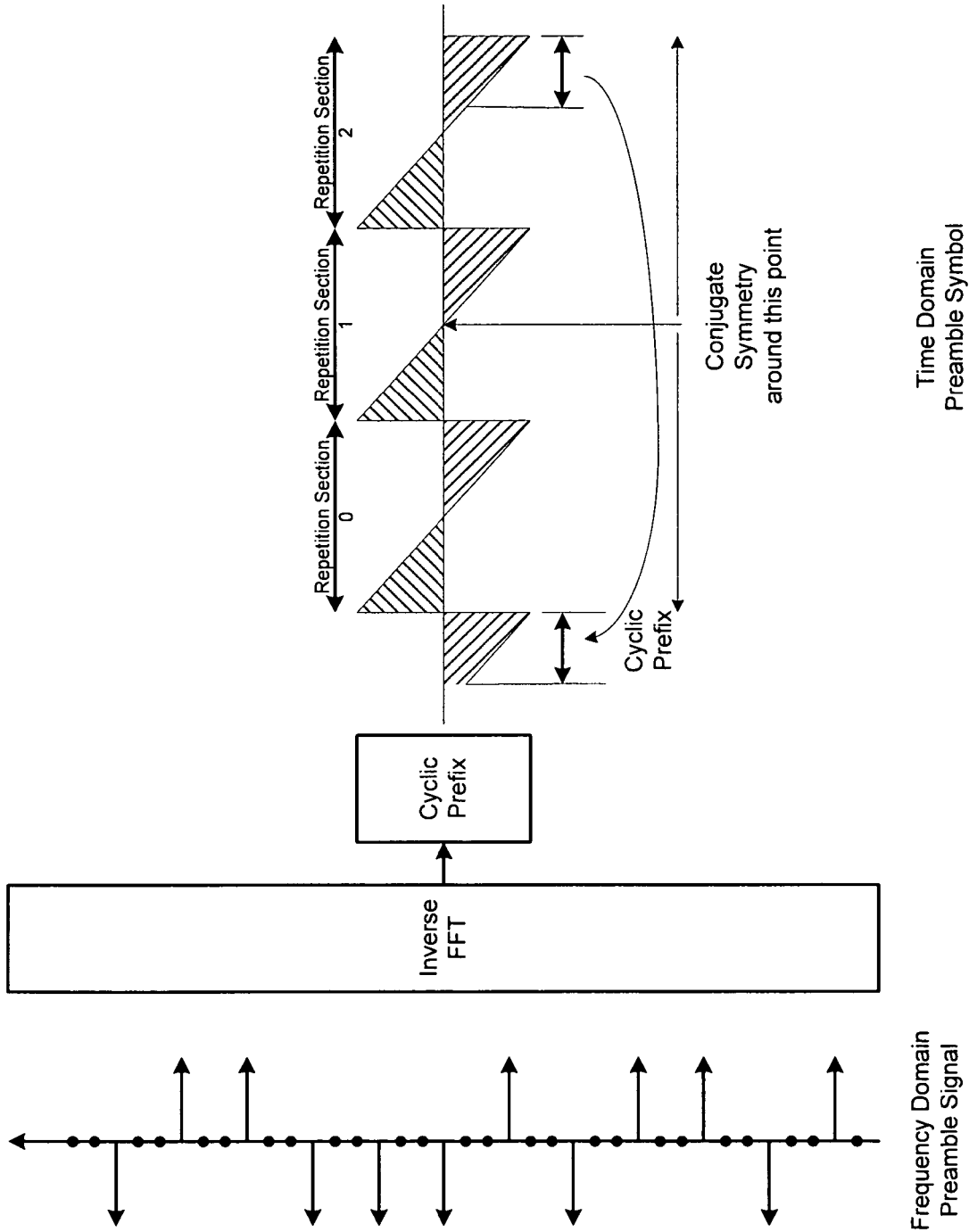
FIG. 5 illustrates an OFDM preamble signal structure.

As will be explained in more detail below, FIG. 5 illustrates an OFDM preamble signal structure, including a preamble symbol. Based on the definition of the preamble symbol described above, the following set of correlation properties in the time domain are described.

Delay Correlation:

The preamble signal in the frequency domain may be constructed by modulating every third subcarrier with a PN sequence and zeroing out the signal in other subcarriers. This frequency domain preamble structure leads to repetition of the signal every one third of the FFT size in time domain. This means that in the received time domain signal at the client terminal there is strong correlation between samples that are separated by one-third of the FFT size (or number of samples). This is referred to herein as "Delay Correlation."

Conjugate Symmetry Correlation:

The preamble in time domain has conjugate symmetry around its middle. This property stems from the fact that the preamble signal in frequency domain is constructed by Binary Phase Shift Keying ("BPSK") modulation, which is a real signal, and therefore the preamble in time domain has even symmetry for magnitude and odd symmetry for phase.

Cyclic Prefix (CP) Correlation:

A property that is common to all OFDMA symbols including preamble is the cyclic prefix ("CP"). The CP of the received OFDM symbol is correlated with the end part of the OFDM symbol.

The above three properties of the preamble, namely Delay Correlation, Conjugate Symmetry Correlation and CP Correlation, are illustrated in FIG. 5. One or more of the above three properties may be exploited in the preamble detection. The time domain repetition described by Delay Correlation Property may be used as a first step in detecting the preamble. The distance (in terms of number of samples) between samples that are correlated depends on the FFT size and sampling rate. OFDM symbol parameters for different bandwidths and FFT sizes are shown in the table of FIG. 6.

Figure 7A:
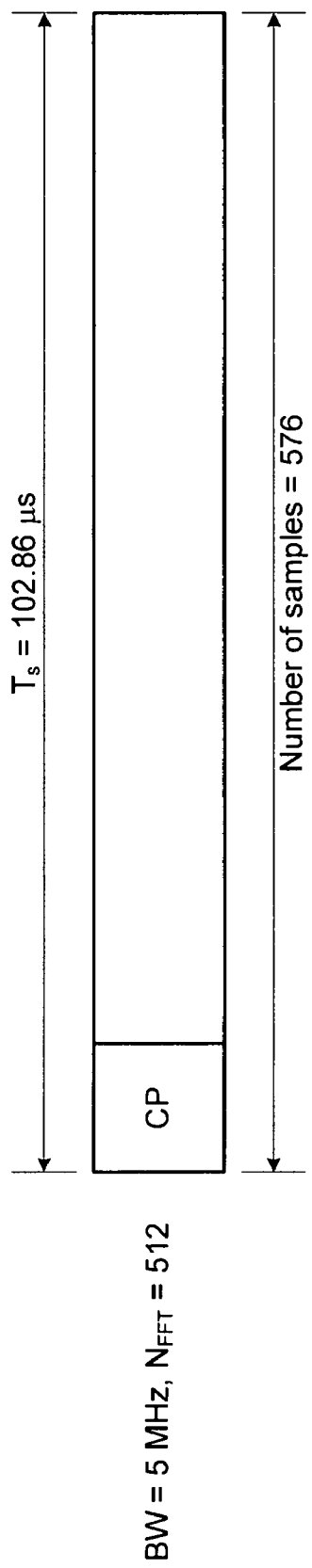
FIGS. 7A-B illustrate OFDM symbol parameters for different FFT sizes.
Figure 7B:
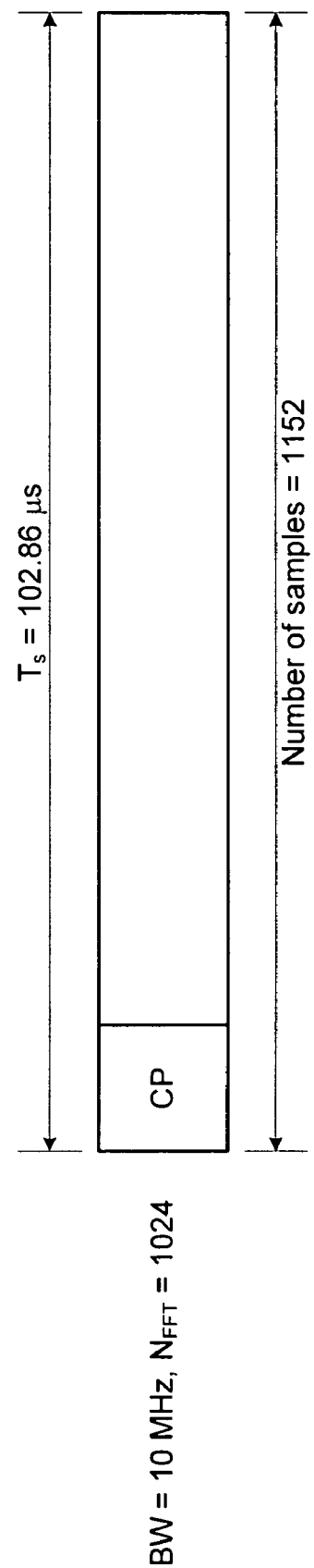

As shown in FIG. 6, the OFDM symbol duration may be exactly the same for 5 MHz and 10 MHz channel bandwidths. FIGS. 7A-B show visual representation for relationships between the OFDM symbol parameters for 1024 FFT and 512 FFT sizes. The number of samples collected for a 1024 FFT size may be always twice the number of samples collected for a 512 FFT size as shown in FIGS. 7A-B. Similarly, for 3.5 MHz and 7 MHz channel bandwidths, the OFDM symbol duration is also exactly the same. In the examples of FIGS. 7A-B, the CP length used is $1/8^{th}$ of the FFT size. However aspects of the present invention are applicable for any CP length.

The Delay Correlation can be performed with three different degrees of complexity. For example, a low complexity solution may correlate only one pair of sections out of the total three repeated sections shown in FIG. 5. For example, it may correlate a signal in repetition section 0 with the signal in repetition section 1. A medium complexity implementation may correlate two pairs of sections. For example, it may correlate section 0 with section 1 and section 1 with section 2. Finally, the highest complexity implementation may use all three pairs of correlations. Specifically, it may correlate section 0 with section 1, section 1 with section 2, and section 0 with section 2. The results of correlation from different pairs may be accumulated to form more robust decision metric.

Let the received signal be denoted by r(n) where n is the current sample index. Let D denote the approximate delay in samples between the two repeating sections of the preamble as shown in FIG. 5. For a 1024 point FFT, D=342 and for a 512 point FFT, D=171 can be used. The delay correlation $X_{DC\_1}(n)$ for one section pair can be expressed as follows:

$$X_{DC\_1}(n) = \sum_{i=0}^{D-1} r(n-i) \cdot r*(n-i-D) \quad (1)$$

Equation (1) describes the correlation between a current sample and a sample that was received D samples time earlier. There are D such correlations covering the entire length of the repeating section as shown in FIG. 5 that are added together. For increased reliability, the correlation between the three different pairs of repeating sections can be added together. The correlation between the first and second sections added with correlation between the second and third sections can be expressed as follows.

$$X_{DC\_2}(n) = \sum_{i=0}^{D-1} r(n-i) \cdot r*(n-i-D) + r(n-i-D) \cdot r*(n-i-2D) \quad (2)$$

The correlations of different section pairs in general are complex. The correlation of section pairs are added such that they combine constructively as shown in equation (3) for three section pair correlations.

$$X_{DC\_3}(n) = \left| \sum_{i=0}^{D-1} r(n-i) \cdot r*(n-i-D) + r(n-i-D) \cdot r*(n-i-2D) \right| + \left| \sum_{i=0}^{D-1} r(n-i) \cdot r*(n-i-2D) \right| \quad (3)$$

Depending on the desired complexity and performance either equation (1), equation (2) or equation (3) can be used for implementation.

Equation 1 can be arranged as follows:

$$X_{DC\_1}(n) = X_{DC\_1}(n) + r(n) \cdot r*(n-D) - r(n-D) \cdot r*(n-2D) \quad (4)$$

The initial value of $X_{DC\_1}(n)$ is set to zero. The sliding window correlator structure shown in FIG. 8 implements the computations in equation (4), which is mathematically identical to the computations in equation (1). The buffers and the accumulator may be initialized to zero at the beginning of the detection process.

Figure 8:
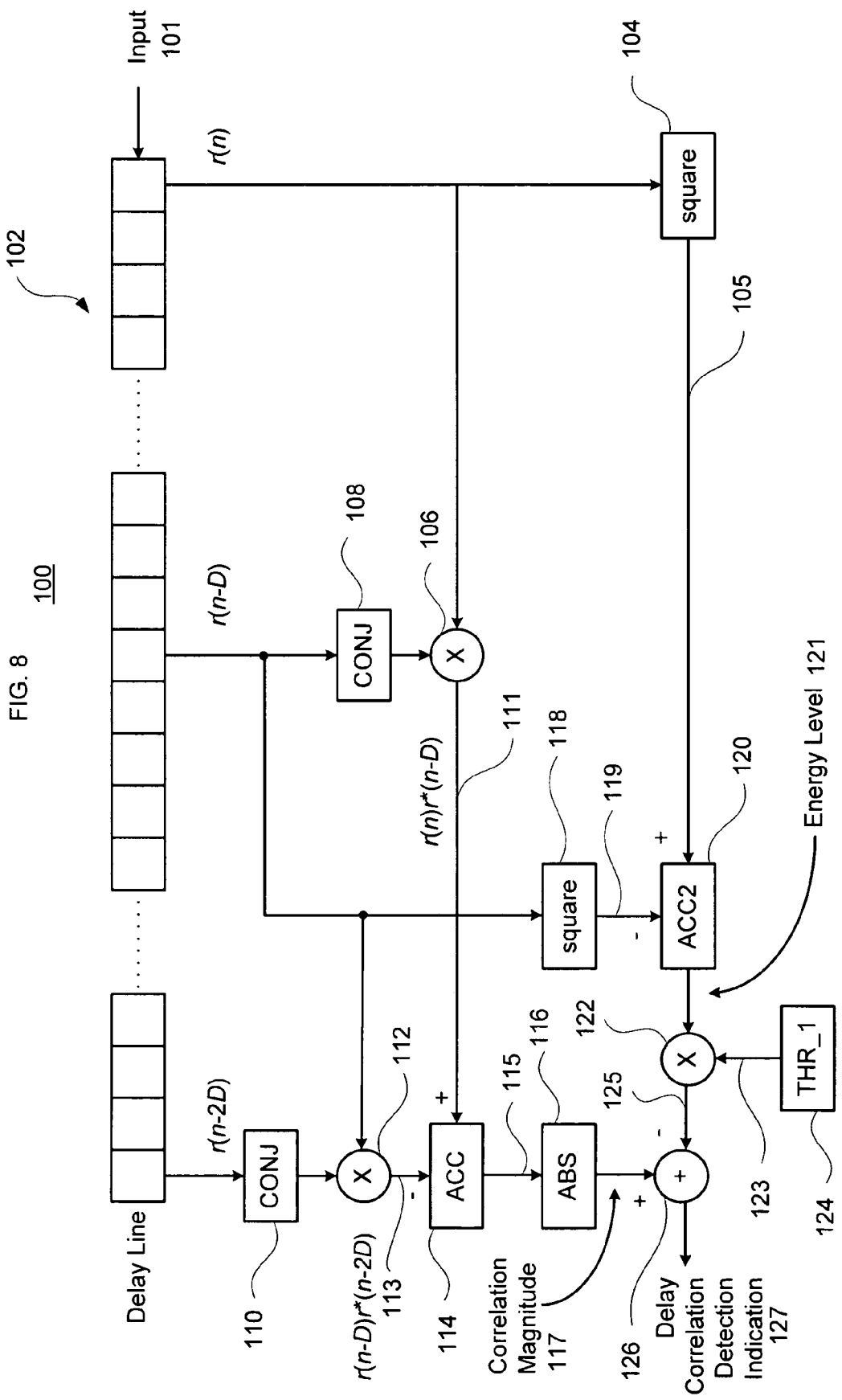
FIG. 8 illustrates a conventional sliding window correlator structure.

A sliding window correlator structure 100 as shown in FIG. 8 has been used to detect the repetition pattern in the preamble signal.

In FIG. 8, the received samples are stored in a buffer, illustrated as delay line 102, for correlation purposes. The length of the delay line 102 depends on the samples being correlated. The same sliding window correlator structure can be used for Delay Correlation as well as for CP Correlation by correlating different signal samples.

As shown, an input signal 101 is received by a delay line 102. The delay line 102 provides a first output, r(n), a second output, r(n−D), and a third output, r(n−2D). The first output is provided to nodes 104 and 106. The second output is provided to nodes 108 and 112. And the third output is also provided to the node 110. The node 104 squares the first output, resulting in signal 105. Nodes 108 and 110 take the conjugates of the respective received signals. For instance, the output conjugate r(n−D) signal from node 108 is multiplied with the first output r(n) at node 106, resulting in signal 111, which may be represented by r(n) r*(n−D). And node 110 takes the conjugate of the third output and provides that signal to multiplier 112, which outputs a resultant signal 113, which may be represented by r(n−D)r*(n−2D).

At node 114 such as an accumulator, the signal 113 is subtracted from signal 111 and added to the contents stored in the accumulator, resulting in signal 115. The accumulator 113 may be initialized to zero at the start of each preamble search and it accumulates the values as preamble search progresses. At node 116, the absolute value of signal 115 is taken, resulting in signal 117, which represents the correlation magnitude. And at node 118, the square of the second output is taken, resulting in signal 119. At node 120 such as an accumulator, the signal 119 is subtracted from the signal 105 and added it to the contents stored in the accumulator, resulting in signal 121. Signal 121 output by the node 120 represents an energy level of the received signal.

The output signal 121 is multiplied at node 122 with a signal 123 from node 124. Node 124 is a hardware register THR_1 and it may be programmed by the firmware or may be hardcoded to a fixed value. THR_1 is programmed or hardcoded to an empirically determined value which corresponds to the ratio of correlation magnitude to energy level. If the correlation magnitude 117 is equal to or greater than the energy level scaled by the value in THR_1 then delay correlation detection indication 127 is positive. If the correlation magnitude 117 is smaller than the energy level scaled by the value in THR_1 then delay correlation detection indication 127 is negative. The output of node 122, which is illustrated as signal 125, is subtracted from signal 117, the correlation magnitude, at node 126. Signal 127 output from node 126 is a delay correlation detection indication.

Figure 9:
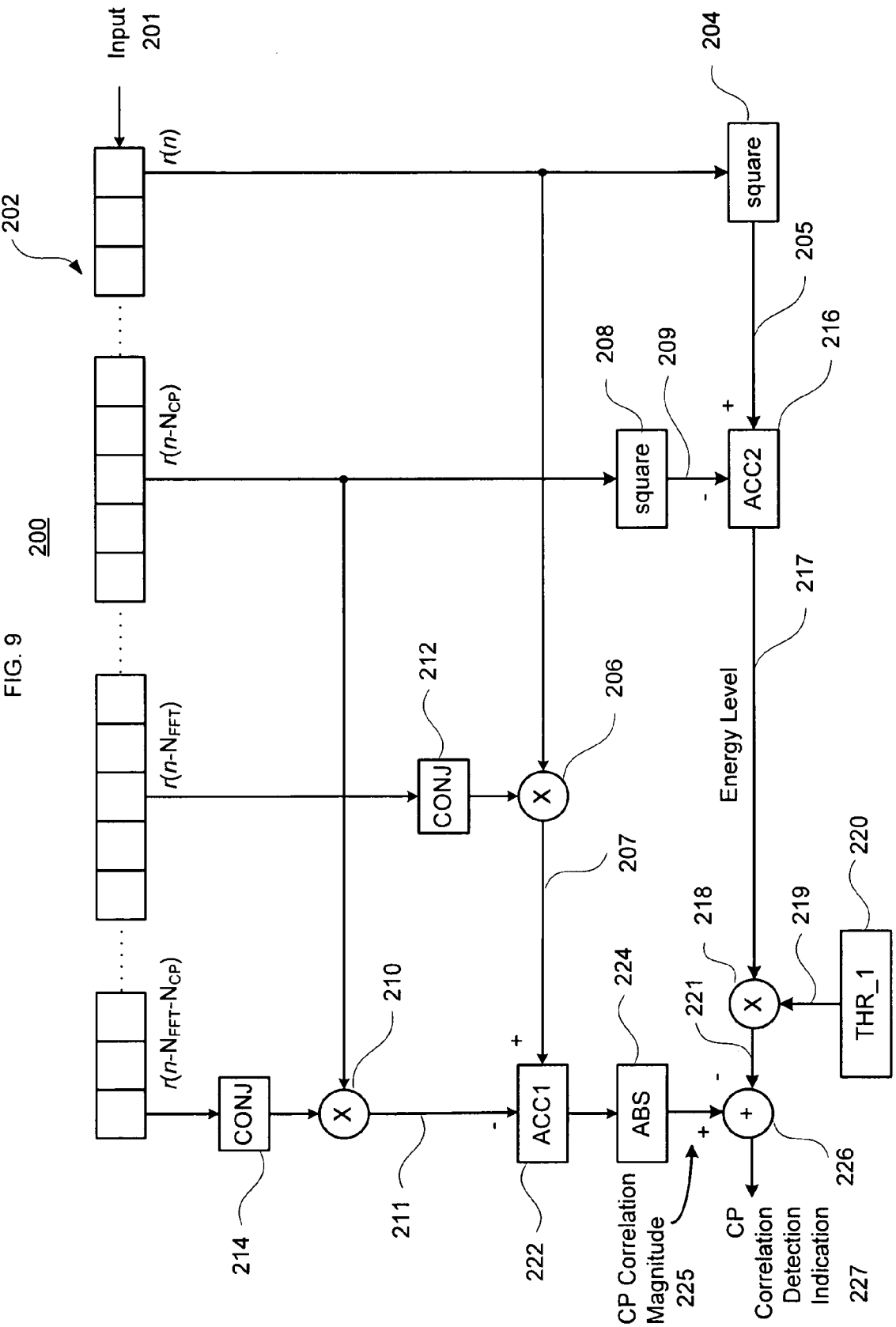
FIG. 9 illustrates another conventional sliding window correlator structure.

Another sliding window correlator 200 as shown in FIG. 9 may also be used to detect the CP repetition pattern in the preamble symbol. As shown, an input signal 201 is received by a delay line 202. The delay line 202 provides a first output, r(n), a second output, r(n−$N_{CP}$), a third output, r(n−$N_{FFT}$) and a fourth output, r(n−$N_{FFT}$−$N_{CP}$). The first output is provided to nodes 204 and 206. The second output is provided to nodes 208 and 210. The third output is provided to node 212. The fourth output is provided to node 214. $N_{CP}$ represents herein the length of CP. $N_{FFT}$ represents the FFT size.

The node 204 squares the first output, resulting in signal 205. Node 208 squares the second output, resulting in signal 209. At node 216 such as an accumulator, the signal 209 is subtracted from signal 205 and added it to the value stored in the accumulator, resulting in signal 217. The output of node 216, namely signal 217, is the energy level which is fed to node 218. The energy level is multiplied at node 218 with a signal 219 from node 220. Node 220 is a hardware register THR_1 and it may be programmed by the firmware or may be hardcoded to a fixed value. THR_1 is programmed or hardcoded to an empirically determined value which corresponds to the ratio of correlation magnitude to energy level. If the correlation magnitude 225 is equal to or greater than the energy level scaled by the value in THR_1 then CP correlation detection indication 227 is positive. If the CP correlation magnitude 225 is smaller than the energy level scaled by the value in THR_1 then CP correlation detection indication 227 is negative. The output of node 218 is illustrated as signal 221.

Meanwhile, at node 212, the conjugate of the third output is generated, and the resultant signal is multiplied with the first output, r(n), at node 206. Resultant signal 207 is output from node 206. Similarly, the conjugate of the fourth output is generated by node 214, and the resultant signal is multiplied with the second output at node 210. Resultant signal 211 is output from node 210. At node 222 such as an accumulator, the signal 211 is subtracted from signal 207 and added it to the value stored in the accumulator. The output from node 222 is provided to node 224.

At node 224, the absolute value of the signal from node 222 is taken, resulting in signal 225. Signal 225 represents the correlation magnitude. The output of node 218, namely signal 221, is subtracted from signal 225, the correlation magnitude, at node 226. Signal 227 output from node 226 is a CP correlation detection indication.

The preamble detection indication may be determined by using the delay correlation detection indication. Also the preamble detection indication may be determined by the combination of delay correlation detection indication and the CP correlation detection indication.

It should be understood that the delay between the signals that are correlated may be different for Delay Correlation and CP Correlation. Specifically, in the present example, Delay Correlation occurs over ⅓ of the FFT size whereas the CP Correlation occurs over a delay that is equal to the FFT size, as shown in FIG. 9. In case of Delay Correlation, the number of samples that are correlated is the same as the distance between the two repeating sections. In case of CP Correlation, the number of samples that are correlated depends on the length of the CP chosen by the system which is usually a small fraction of the FFT length.

For full CP Correlation, it is necessary for the delay line to be equal to or greater than one OFDM symbol. As each new sample is received, all the samples in the delay line are shifted, e.g. to the left by one in the example of FIG. 9, to make storage space available for the newly captured sample at the rightmost side of the delay line. Alternatively, the sample buffer may be addressed in a circular manner to avoid shift operations.

The same sliding window correlator structure can be used for Delay Correlation as well as for CP Correlation by correlating different signal samples.

Figure 10:
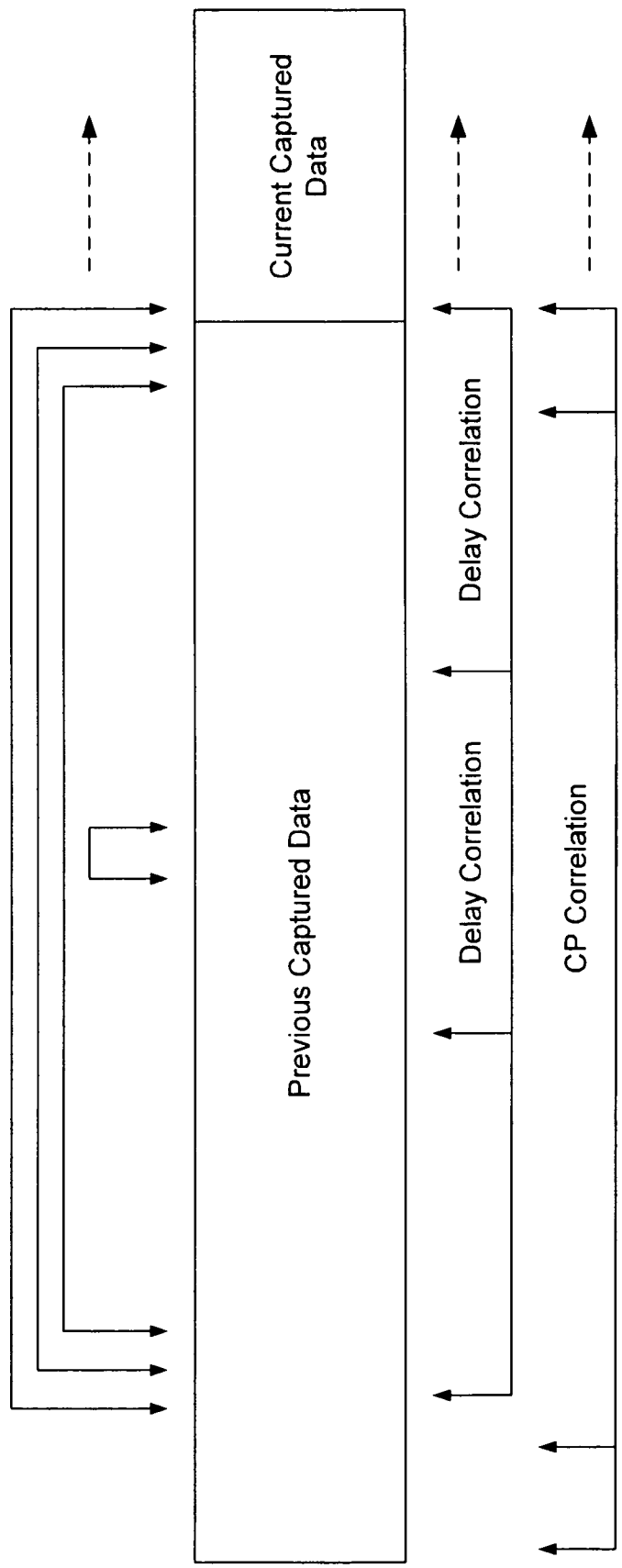
FIG. 10 illustrates the relationship among Delay Correlation, CP Correlation and Conjugate Symmetry Correlation for a preamble symbol.

The samples from the analog to digital converter can be processed directly as they are received. Alternatively, the processing can be performed on a small group of samples at a time as shown in FIG. 10.

The distance between the preamble samples that are correlated will depend on the FFT size. The distance in samples for Delay Correlation and the CP Correlation are different for a particular FFT size. The Conjugate Symmetry Correlation detection may require significantly more computations than the Delay Correlation and CP Correlation detection. Therefore Delay Correlation and CP Correlation are often performed first and the Conjugate Symmetry Correlation may be searched once the Delay Correlation detection and CP Correlation detection indicate the possible presence of a preamble. Conjugate Symmetry Correlation may be more useful for finding the exact preamble symbol start position rather than detection of preamble itself.

In accordance with aspects of the present invention, parallel sliding window correlator structures may be employed to search in parallel for a number of preambles. The following FFT and channel bandwidth combinations are exemplary scenarios of what may be searched in parallel using any of the parallel correlator structures discussed herein.

Combination I

This example focuses on different channel bandwidths and FFT sizes. For example an FFT size of 2048 may have a channel bandwidth of 20 MHz. An FFT size of 1024 may have a channel bandwidth of 10 MHz. And an FFT size of 512 may have channel bandwidth of 5 MHz, while an FFT size of 128 may have a channel bandwidth of 1.25 MHz. Such scenarios can be searched in parallel with parallel sliding window correlator structures in accordance with aspects of the present invention.

Figure 11:
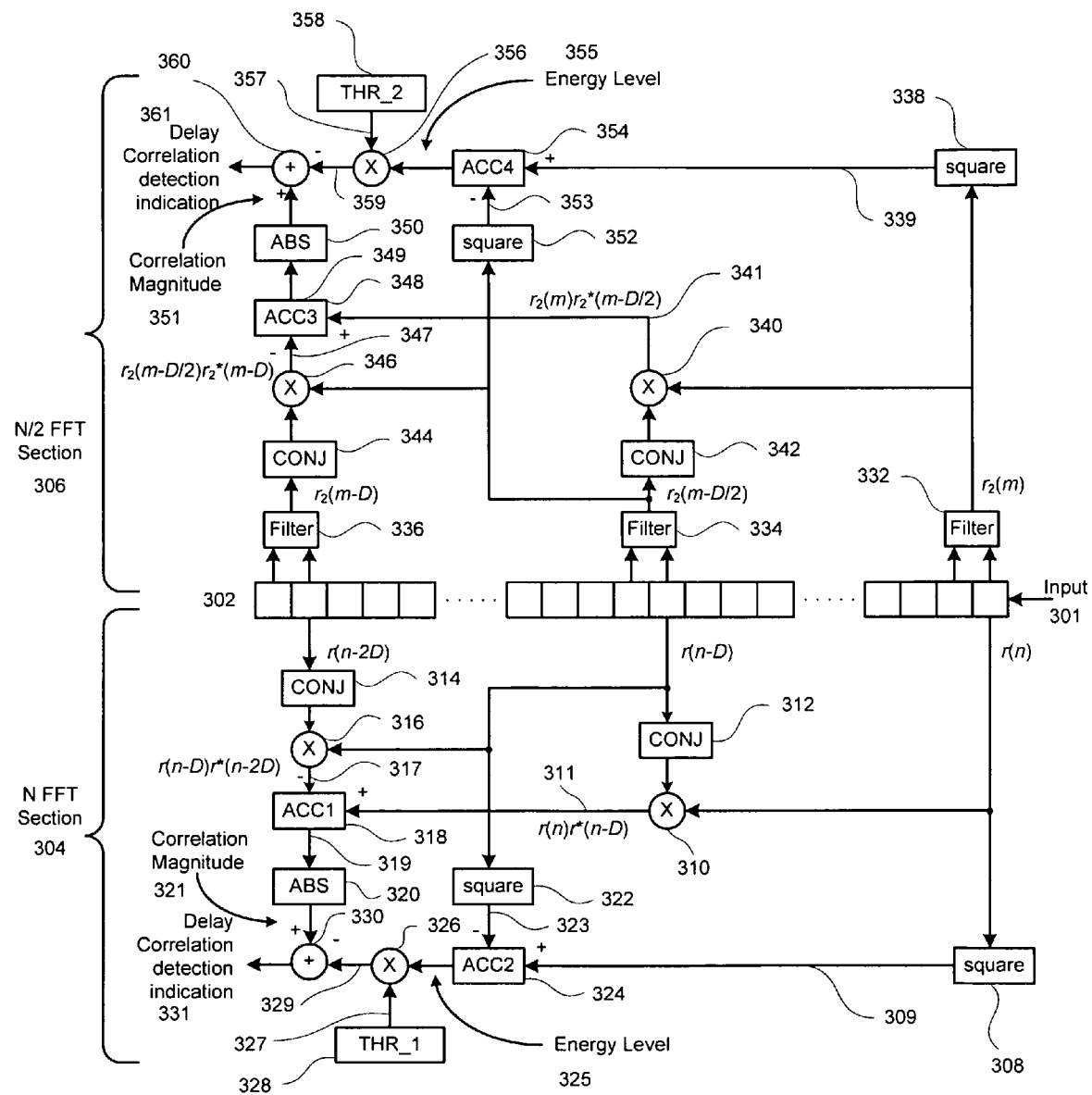
FIG. 11 illustrates a parallel sliding window correlator structure in accordance with aspects of the present invention.

FIG. 11 illustrates an exemplary parallel sliding window correlator structure 300 for searching two preambles where one FFT size is half of the other FFT size. As shown, an input signal 301 is received by a delay line 302. As will be explained in more detail below, the delay line 302 provides inputs for two FFT sections, namely N FFT section 304 and N/2 FFT section 306. Delay lines may be implemented in different ways, such as with shift registers or circular buffers.

It can be seen that the N FFT section 304 is similar to the architecture of sliding window correlator 100 of FIG. 8. Here in FIG. 11, the delay line 302 provides a first output, r(n), a second output, r(n−D), and a third output, r(n−2D) to the N FFT section 304. The first output is provided to nodes 308 and 310. The second output is provided to nodes 312 and 316, while the third output is provided to node 314.

The node 308 squares the first output, resulting in signal 309. Nodes 312 and 314 take the conjugates of the respective received signals r(n−D) and r(n−2D). For instance, the output conjugate r(n−D) signal from node 312 is multiplied with the first output r(n) at node 310, resulting in signal 311, which may be represented by r(n) r*(n−D). And node 314 takes the conjugate of the third output r(n−2D) and provides that signal to multiplier of node 316. The other input to node 316 is the second output r(n−D). Node 316 outputs a resultant signal 317, which may be represented by r(n−D)r*(n−2D).

At node 318 such as an accumulator, the signal 317 is subtracted from signal 311 and added it to the value stored in the accumulator, resulting in signal 319. At node 320, the absolute value of signal 319 is taken, resulting in signal 321, which represents the correlation magnitude. And at node 322, the square of the second output is taken, resulting in signal 323. At node 324 such as an accumulator, the signal 323 is subtracted from the signal 309 and added it to the value stored in the accumulator. Signal 325 output by the node 324 represents an energy level of a received signal.

The output signal 325 is multiplied at node 326 with a signal 327 from node 328. Node 328 is preferably a hardware register THR_1 and it may be programmed by the firmware or may be hardcoded to a fixed value. THR_1 is programmed or hardcoded to an empirically determined value which corresponds to the ratio of correlation magnitude to energy level. If the correlation magnitude 321 is equal to or greater than the energy level scaled by the value in THR_1 then Delay correlation detection indication 331 is positive. If the correlation magnitude 321 is smaller than the energy level scaled by the value in THR_1 then delay correlation detection indication 331 is negative. The output of node 326, which is illustrated as signal 329, is subtracted from signal 321, the correlation magnitude, at node 330. Signal 331 output from node 330 is the delay correlation detection indication for the N FFT section.

In this example, one preamble with FFT size of 1024 with channel bandwidth of 10 MHz can be searched in parallel with another preamble with FFT size of 512 with channel bandwidth of 5 MHz. Of course, it should be understood that combinations of other FFT sizes and channel bandwidths may be searched in parallel with the parallel sliding window correlator structure 300. By way of example, parallel preamble searches may be performed for any combinations such as N FFT size and N/2 FFT size, N FFT size and N/4 FFT size, N FFT size and N/8 FFT size, etc.

Turning to the N/2 FFT section 306, it can be seen in FIG. 11 that outputs from the delay line 302 may be filtered by filters 332, 334 and 336, producing a fourth output, $r_2(m)$, a fifth output, $r_2(m-D/2)$, and a sixth output, $r_2(m-D)$, respectively, where m is a sample index for the decimated signal. The fourth output is provided to nodes 338 and 340. The fifth output is provided to nodes 342 and 346, while the sixth output is provided to node 344.

The node 338 squares the fourth output, resulting in signal 339. Nodes 342 and 344 take the conjugates of the respective received signals $r_2$ (m-D/2) and r(m-D). For instance, the output conjugate $r_2(m-D/2)$ signal from node 342 is multiplied with the fourth output r(m) at node 340, resulting in signal 341, which may be represented by $r_2(m)r_2^*(m-D/2)$. And node 344 takes the conjugate of the sixth output $r_2(m-D)$ and provides that signal to multiplier of node 346. The other input to node 346 is the fifth output $r_2(m-D/2)$. Node 346 outputs a resultant signal 347, which may be represented by $r_2(m-D/2) r_2^*(m-D)$.

At node 348 such as an accumulator, the signal 347 is subtracted from signal 341 and added it to the value stored in the accumulator, resulting in signal 349. At node 350, the absolute value of signal 349 is taken, resulting in signal 351, which represents the correlation magnitude. And at node 352, the square of the fifth output is taken, resulting in signal 353. At node 354 such as an accumulator, the signal 353 is subtracted from the signal 339 and added it to the value stored in the accumulator. Signal 355 output by the node 354 represents an energy level of the received signal.

The output signal 355 is multiplied at node 356 with a signal 357 from node 358. Node 358 is preferably a hardware register THR_2 and it may be programmed by the firmware or may be hardcoded to a fixed value. THR_2 is programmed or hardcoded to an empirically determined value which corresponds to the ratio of correlation magnitude to energy level. If the correlation magnitude 351 is equal to or greater than the energy level scaled by the value in THR_2 then delay correlation detection indication 361 is positive. If the correlation magnitude 351 is smaller than the energy level scaled by the value in THR_2 then delay correlation detection indication 361 is negative. The output of node 356, which is illustrated as signal 359, is subtracted from signal 351, the correlation magnitude, at node 360. Signal 361 output from node 360 is a delay correlation detection indication for the N/2 FFT section.

The correlation between one repeating section and another section will exist regardless of the sample rate at which the signal is digitized and captured at the receiver. For instance, in one example, the preamble symbol duration for a 5 MHz channel bandwidth is identical with that of the preamble symbol duration for a 10 MHz channel bandwidth. However, the sampling rate will be different for these two channel bandwidths. Specifically, the sampling rate for a 5 MHz channel bandwidth may be 5.6 MHz while the sampling rate for the 10 MHz channel bandwidth may be 11.2 MHz.

If the 5 MHz preamble signal is sampled at 5.6 MHz, the distance in samples between two repeating sections will be approximately $512/3 \approx 171$ samples. However, if the same signal is sampled at twice the rate, i.e., 11.2 MHz, the distance in samples between two repeating sections will be approximately 2*171=342 samples. Therefore, performing Delay Correlation between samples that are separated by 342 samples when the sampling rate is 11.2 MHz can detect either a 1024 FFT size with a 10 MHz channel bandwidth or 512 FFT size with a 5 MHz channel bandwidth.

To differentiate between the detection of two or more possible FFTs and to reduce interference from the adjacent channels, the received samples may be decimated and filtered for the sections that are searching the smaller channel bandwidth and FFT sizes as shown in the upper section 306 (N/2 FFT section) of FIG. 11. A decimation filter reduces the sample rate as shown and hence reduces the processing requirements as well. The coefficients of the decimation and filtering are programmed dynamically depending on the particular scenario such as the channel bandwidth and the sample rate being considered. The filter coefficient values may be programmed by the firmware into the coefficient registers in the filters.

Figure 12A:
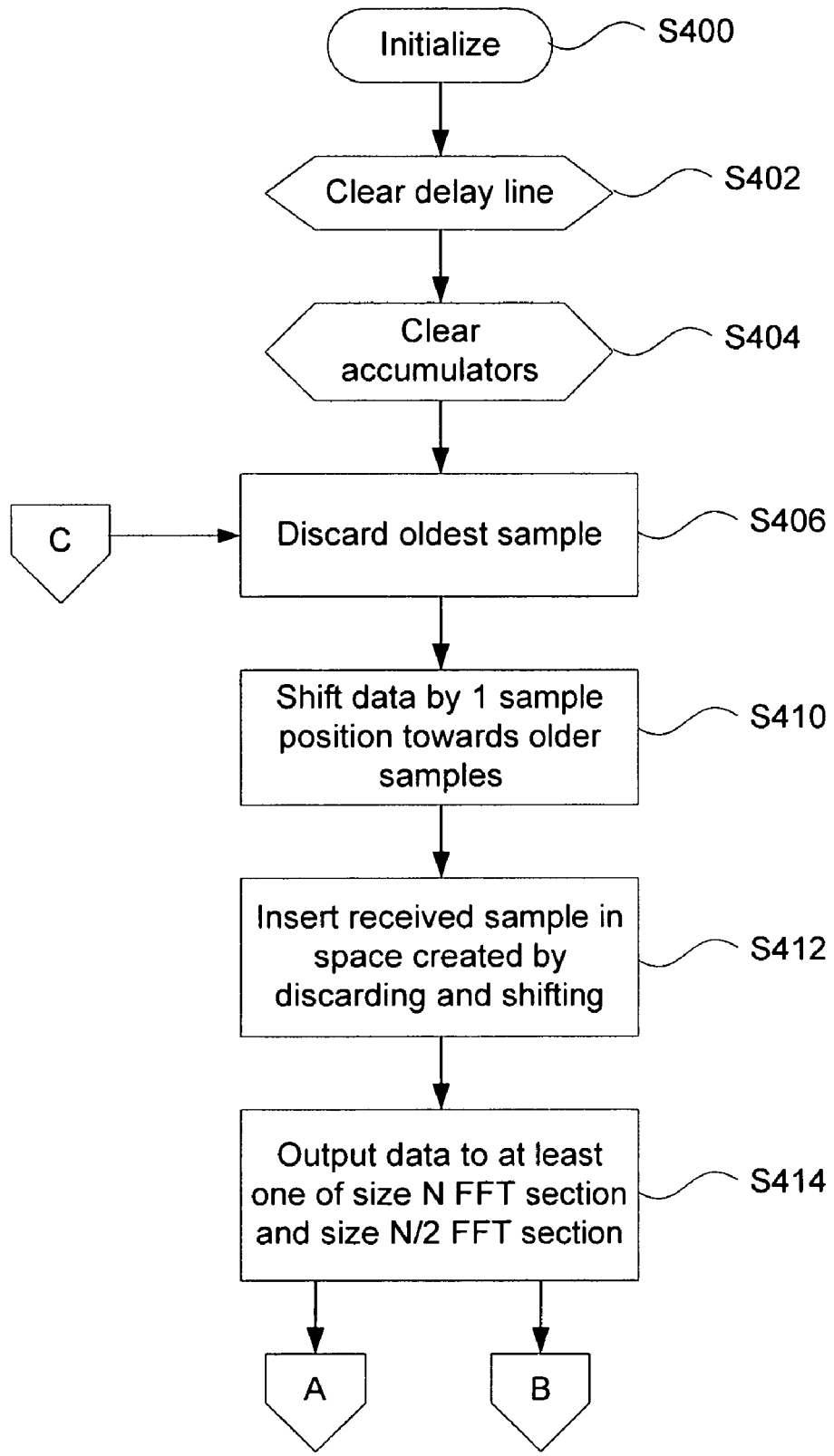
FIGS. 12A-C illustrate a parallel sliding window correlator process in accordance with aspects of the present invention.
Figure 12B:
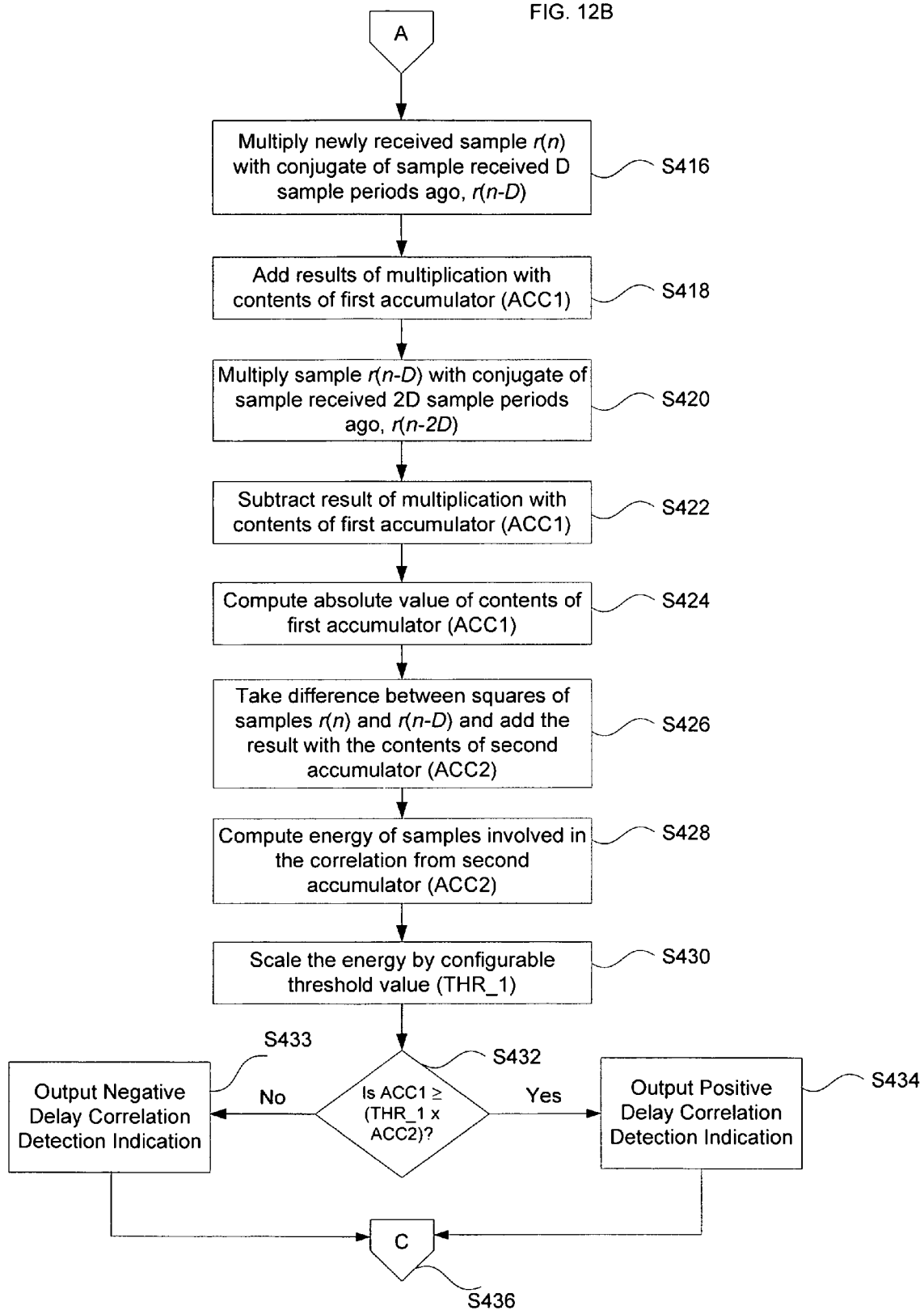
Figure 12C:
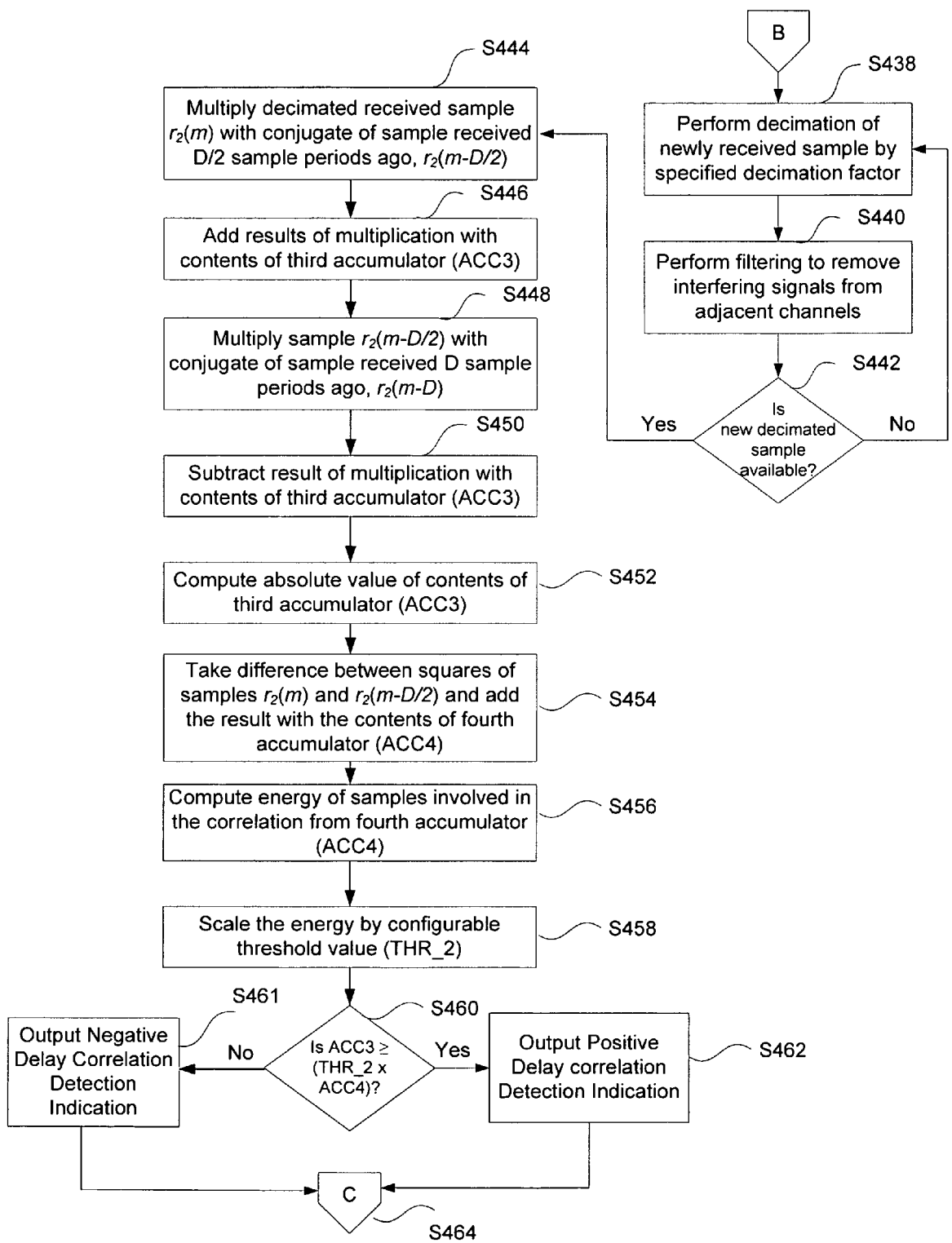

FIGS. 12A-C present an exemplary operational process 400 of the parallel sliding window correlator illustrated in FIG. 11. This process can be applied for a parallel sliding window correlator for processing of any number of preambles in parallel in accordance with Combination I, although it is not limited to such examples.

The process in FIG. 12A initializes in step S400, for example during power on of a user's mobile station. At step S402 the delay line, such as delay line 302, may be cleared. The accumulators (e.g., ACC1, ACC2, ACC3 and ACC4) may also be cleared, as shown at step S404. Data is received by the delay line as shown in step S406.

During operation, data is cycled through the delay line, with older data being discarded as new data is received. Thus, as shown in step S406, the oldest sample may be discarded out of the delay line, data is shifted by one sample position in the delay line towards older samples as shown in step S410, and a new received sample is inserted in the space created by discarding and shifting older samples in the delay line as shown in step S412. As shown in FIG. 11, the oldest sample is in the leftmost position of the delay line and the newest sample is in the rightmost position of the delay line. Per step S406, the leftmost (oldest) sample would be discarded and the other samples in the delay line are shifted toward the left per step S410. And a new received sample is stored in the rightmost position of the delay line per step S412.

As shown at step S414, data from the delay line may be output to one or both FFT sections, such as N FFT section 304 and N/2 FFT section 306 of FIG. 11. In the former case of an N FFT section, the process continues at FIG. 12B. In the latter case of an N/2 FFT section, the process continues at FIG. 12C.

Turning to step S416 of FIG. 12B, newly received sample r(n) is multiplied with the conjugate of a sample received D sample periods ago, which is represented by r(n-D). In the example of FIG. 11, this corresponds to the operation at node 310. At step S418, the result from step S416 (e.g., signal 311) is added with the contents of an accumulator (e.g., ACC1 at node 318). At step S420, sample r(n-D) is multiplied with the conjugate of a sample received 2D sample periods previously, represented by r(n-2D), for instance as shown at node 316 of FIG. 11. As noted in step S422, the result of the multiplication of step S420 is subtracted from the value added to the accumulator in step S418. This may be signal 317 output by node 316 of FIG. 11. Then at step S424 the absolute value of this result.

As shown at step S426, the difference between the squares of samples r(n) and r(n-D). With reference to FIG. 11, this may be done at node 324 (e.g., accumulator ACC2). Then at step S428, the energy of samples involved in the correlation from the second accumulator (e.g., ACC2) is computed. The energy level is represented by signal 325 of FIG. 11. Then the energy level may be scaled by a value (e.g., THR_1) as shown by step S430. The value may be a threshold value. The threshold value is desirably configurable. THR_1 may be programmed by the firmware or may be hardcoded to a fixed value.

A comparison is made at step S432, where the value (e.g., signal 321) computed in step S424 is compared to the scaled value (e.g., signal 329) computed in step S430. If the value computed in step S424 equals or exceeds the value computed in step S430, then a positive delay correlation detection indicator (e.g., signal 331) is output in step S434. If the value computed in step S424 does not exceed the value computed in step S430, then a negative delay correlation detection indicator (e.g., signal 331) is output in step S433. As shown by step S436, the process may then return to step S406 of FIG. 12A.

As noted above, a process for the N/2 FFT section is illustrated in FIG. 12 C. Here, at step S438, the decimation of a newly received sample into the delay line is performed in accordance with a specified decimation factor. For a case of parallel preamble search of size N FFT and N/2 FFT the decimation factor may be 2. The decimation factor may be programmed by the firmware. Filtering may also be performed to remove interfering signals, as shown at step S440. Then at step S442 a determination is made as to whether a new decimated sample is available. If one is not, then the process returns to step S438. Otherwise, the process may proceed at step S444.

Turning to step 444, decimated received sample $r_2(m)$ is multiplied with the conjugate of a sample received D/2 sample periods ago, which is represented by $r_2(m-D/2)$. In the example of FIG. 11, this corresponds to the operation at node 340. At step S446, the result from step S444 (e.g., signal 341) is added with the contents of an accumulator (e.g., ACC3 at node 348). At step S448, sample $r_2(m-D/2)$ is multiplied with the conjugate of a sample received D sample periods previously, represented by $r_2(m-D)$, for instance as shown at node 346 of FIG. 11. As noted in step S450, the result of the multiplication of step S448 is subtracted from the value added to the accumulator in step S446. This may be signal 347 output by node 346 of FIG. 11. Then at step S452 the absolute value of this result is obtained.

As shown at step S454, the difference between the squares of samples $r_2(m)$ and $r_2(m-D/2)$. With reference to FIG. 11, this may be done at node 354 (e.g., accumulator ACC4). Then at step S456, the energy of samples involved in the correlation from the fourth accumulator (e.g., ACC4) is computed. The energy level is represented by signal 355 of FIG. 11. Then the energy level may be scaled by a value (e.g., THR_2) as shown by step S458. The value may be a threshold value. The threshold value is desirably configurable. THR_2 may be programmed by the firmware or may be hardcoded to a fixed value.

A comparison is made at step S460, where the value (e.g., signal 351) computed in step S452 is compared to the scaled value (e.g., signal 359) computed in step S458. If the value computed in step S452 equals or exceeds the value computed in step S458, then a positive delay correlation detection indicator (e.g., signal 361) is output in step S462. If the value computed in step S452 does not exceed the value computed in step S458, then a negative delay correlation detection indicator (e.g., signal 361) is output in step S461. As shown by step S464, the process may then return to step S406 of FIG. 12A. Combination II The next example focuses on parallel preamble searches with different channel bandwidths for the same FFT size. By way of example only, for an FFT size of 1024, channel bandwidths of 10 MHz, 8.75 MHz and 7 MHz can be searched in parallel. An exemplary parallel sliding window correlator structure 500 for searching two preambles for a FFT size of 1024 and any of the two channel bandwidth combinations, i.e. 10 MHz and 8.75 MHz, 10 MHz and 7 MHz and 8.75 MHz and 7 MHz is shown in FIG. 13.

When searching for preambles in parallel that have the same FFT size but different channel bandwidths, the same observation about the Delay Correlation and sampling rate described under Combination I above may also be used. In the case of searching for preambles having two different channel bandwidths (e.g., 10 MHz and 8.75 MHz) and the same FFT size (e.g., of 1024), the distance in samples between two repeating sections will be approximately 1024/3≈342 samples when the MHz channel bandwidth signaled is sampled at 11.2 MHz and the 8.75 MHz channel is sampled at 10 MHz. However, if the 8.75 MHz signal is sampled at 11.2 MHz rather than 10 MHz, the distance in samples between two repeating sections of 8.75 MHz signal will be approximately 342*11.2/10=382 samples. Therefore, performing Delay Correlation between samples that are separated by 342 samples when the sampling rate is 11.2 MHz can detect a radio profile with 10 MHz channel bandwidth and 1024 FFT while at the same time performing Delay Correlation between samples that are separated by 382 samples with the same sampling rate of 11.2 MHz can detect a radio profile with 8.75 MHz channel and 1024 FFT size.

Figure 13:
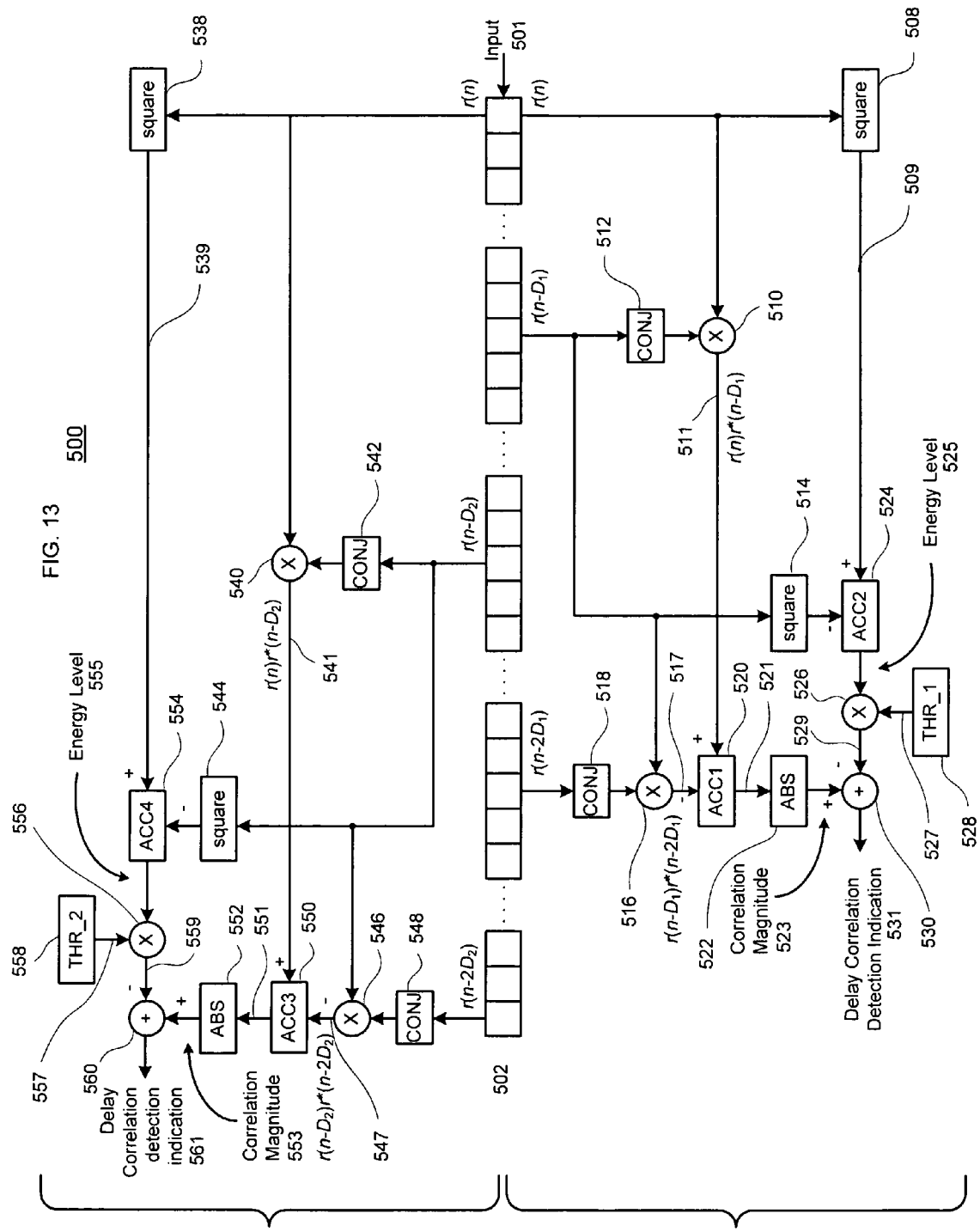
FIG. 13 illustrates a further parallel sliding window correlator structure in accordance with aspects of the present invention.

As shown in FIG. 13, delay line 502 receives input samples 501, and various samples in the delay line are passed to two FFT sections 504 and 506. In FFT section 504, the distance between repeating sections is $D_1$, while in FFT section 506 the distance between repeating sections is $D_2$. Turning to section 504, a first output, $r(n)$, a second output, $r(n-D_1)$, and a third output $r(n-2D_1)$ are utilized. The first output is provided to node 508 and to node 510. The second output is provided to node 512, node 514 and node 516. And the third output is provided to node 518.

Node 508 squares the value of the first output, resulting in output signal 509. Node 512 takes the conjugate of the second output and provides it to node 510. Node 510 multiplies the conjugate of the second output with the first output and issues signal 511, which may be represented by $r(n)r^*(n-D_1)$. The signal 511 is provided to node 520.

At node 518 the conjugate of the third output is taken and is passed to node 516. This node multiplies the conjugate of the third output with the second output and issues signal 517, which may be represented by $r(n-D_1)r^*(n-2D_1)$. At node 520 such as an accumulator, the signal 517 is subtracted from signal 511 and added it to the contents of the accumulator (e.g., ACC1) resulting in signal 521. Signal 521 is received by node 522, where the absolute value of the signal is taken. Resultant signal 523 is the Correlation Magnitude.

Turning to node 514, here the second output is squared and provided to node 524, where it is subtracted from signal 509. At node 524 such as an accumulator, the output of node 514 is subtracted from signal 509 and added it to the contents of the accumulator (e.g., ACC2). The output of node 524 is signal 525, which is the Energy Level. Signal 525 is multiplied at node 526 with signal 527 from node 528. Signal 527 is a threshold value (e.g., THR_1) as described above. The result from node 526, namely signal 529, is subtracted from the Correlation Magnitude, signal 523, at node 530. The resultant output, signal 531, is the delay correlation detection indication for the N FFT section wherein the distance in samples between repeating sections is $D_1$.

Turning to section 506, the first output, $r(n)$, a fourth output, $r(n-D_2)$, and a fifth output $r(n-2D_2)$ are utilized. The first output is provided to node 538 and to node 540. The fourth output is provided to node 542, node 544 and node 546. And the fifth output is provided to node 548.

As with node 508, node 538 squares the value of the first output, resulting in output signal 539. Node 542 takes the conjugate of the fourth output and provides it to node 540. Node 540 multiplies the conjugate of the fourth output with the first output and issues signal 541, which may be represented by $r(n)r*(n-D_2)$. The signal 541 is provided to node 550.

At node 548 the conjugate of the fifth output is taken and is passed to node 546. This node multiplies the conjugate of the fifth output with the fourth output and issues signal 547, which may be represented by $r(n-D_2)r*(n-2D_2)$. At node 550 such as an accumulator, the output of node 547 is subtracted from signal 541 and added it to the contents of the accumulator (e.g., ACC3) and outputs signal 551. Signal 551 is received by node 552, where the absolute value of the signal is taken. Resultant signal 553 is the Correlation Magnitude.

Turning to node 544, here the fourth output is squared and provided to node 554, where it is subtracted from signal 539. At node 554 such as an accumulator, the output of node 544 is subtracted from signal 539 and added it to the contents of the accumulator (e.g., ACC4). The output of node 554 is signal 555, which is the Energy Level. Signal 555 is multiplied at node 556 with signal 557 from node 558. Signal 557 is a threshold value (e.g., THR_2) as described above. The result from node 556, namely signal 559, is subtracted from the Correlation Magnitude, signal 553, at node 560. The resultant output, signal 561, is the delay correlation detection indication for the N FFT section wherein the distance in samples between repeating sections is $D_2$.

Figure 14C:
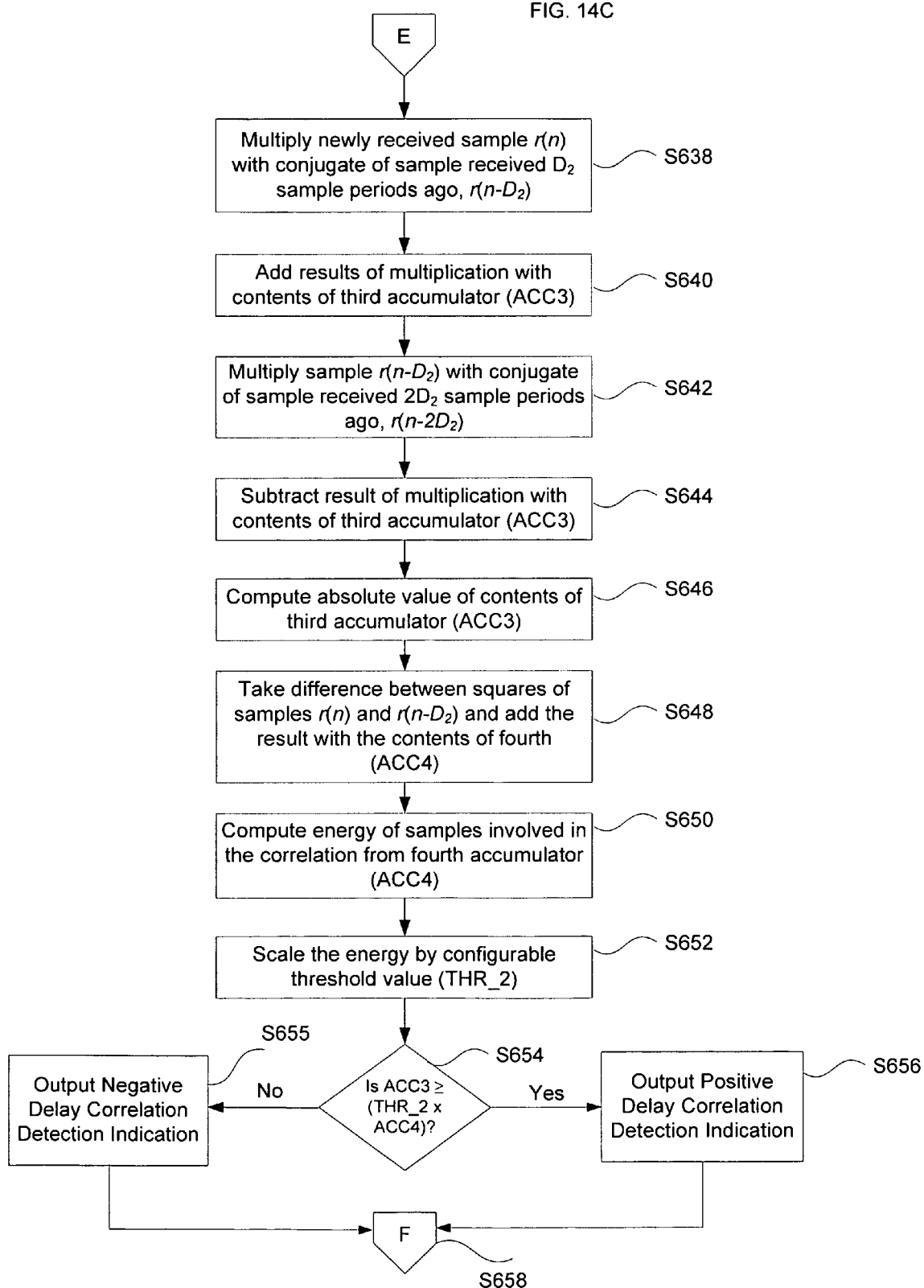

FIGS. 14A-C present an exemplary operational process 600 in accordance with aspects of the invention, including those described herein with regard to Combination II, although it is not limited to such examples. By way of example only, the processes of FIGS. 14A-C may be applied for a parallel sliding window correlator for processing of any number of preambles in parallel corresponding with Combination II.

The process in FIG. 14A initializes in step S600, for example during power on of a user's mobile station. At step S602 the delay line, such as delay line 502, may be cleared. The accumulators (e.g., ACC1, ACC2, ACC3 and ACC4) may also be cleared, as shown at step S604.

During operation, data is cycled through the delay line, with older data being discarded as new data is received. Thus, as shown in step S608, the oldest sample may be discarded out of the delay line, data is shifted by one sample position in the delay line towards older samples as shown in step S610, and a new received sample is inserted in the space created by discarding and shifting older samples in the delay line as shown in step S612. As shown in FIG. 13, the oldest sample is in the leftmost position of the delay line and the newest sample is in the rightmost position of the delay line. Per step S608, the leftmost (oldest) sample would be discarded and the other samples in the delay line are shifted toward the left per step S610. And a new received sample is stored in the rightmost position of the delay line per step S612.

As shown at step S614, data from the delay line may be output to one or both FFT sections, such as N FFT section 504 (for $D_1$) and N FFT section 506 (for $D_2$) of FIG. 13. In the former case of a $D_1$ FFT section, the process continues at FIG. 14B. In the latter case of a $D_2$ FFT section, the process continues at FIG. 14C.

Turning to step 616 of FIG. 14B, newly received sample $r(n)$ is multiplied with the conjugate of a sample received $D_1$ sample periods ago, which is represented by $r(n-D_1)$. In the example of FIG. 13, this corresponds to the operation at node 510. At step S618, the result from step S616 (e.g., signal 511) is added with the contents of an accumulator (e.g., ACC1 at node 520). At step S620, sample $r(n-D_1)$ is multiplied with the conjugate of a sample received $2D_1$ sample periods previously, represented by $r(n-2D_1)$, for instance as shown at node 516 of FIG. 13. As noted in step S622, the result of the multiplication of step S620 is subtracted from the value added to the accumulator in step S618. This may be signal 521 output by node 520 of FIG. 13. Then at step S624 the absolute value of this result is computed.

As shown at step S626, the difference between the squares of samples $r(n)$ and $r(n-D_1)$ is taken. With reference to FIG. 13, this may be done at node 524 (e.g., accumulator ACC2). Then at step S628, the energy of samples involved in the correlation from the second accumulator (e.g., ACC2) is computed. The energy level is represented by signal 525 of FIG. 13. Then the energy level indication may be scaled by a value (e.g., THR_1) as shown by step S630. The value may be a threshold value. The threshold value is desirably configurable. THR_1 may be programmed by the firmware or may be hardcoded to a fixed value.

A comparison is made at step S632, where the value (e.g., signal 523) computed in step S624 is compared to the scaled value (e.g., signal 529) computed in step S630. If the value computed in step S624 equals or exceeds the value computed in step S630, then a positive delay correlation detection indicator (e.g., signal 531) is output in step S634. If the value computed in step S624 does not exceed the value computed in step S630, then a negative delay correlation detection indicator (e.g., signal 531) is output in step S633. As shown by step S636, the process may then return to step S606 of FIG. 14A.

Turning to step S638 of FIG. 14C, newly received sample $r(n)$ is multiplied with the conjugate of a sample received $D_2$ sample periods ago, which is represented by $r(n-D_2)$. In the example of FIG. 13, this corresponds to the operation at node 540. At step S640, the result from step S638 (e.g., signal 541) is added with the contents of an accumulator (e.g., ACC3 at node 550). At step S642, sample $r(n-D_2)$ is multiplied with the conjugate of a sample received $2D_2$ sample periods previously, represented by $r(n-2D_2)$, for instance as shown at node 546 of FIG. 13. As noted in step S644, the result of the multiplication of step S642 is subtracted from the contents of the accumulator (e.g., ACC3 at node 550). This may be signal 551 output by node 550 of FIG. 13. Then at step S646 the absolute value of this result is computed.

As shown at step S648, the difference between the squares of samples $r(n)$ and $r(n-D_2)$ is taken. With reference to FIG. 13, this may be done at node 544. Then at step S650, the energy of samples involved in the correlation from the fourth accumulator (e.g., ACC4) is computed. The energy level is represented by signal 555 of FIG. 13. Then the energy level may be scaled by a value (e.g., THR_2) as shown by step S652. The value may be a threshold value. The threshold value is desirably configurable. THR_2 may be programmed by the firmware or may be hardcoded to a fixed value.

A comparison is made at step S654, where the value (e.g., signal 553) computed in step S646 is compared to the scaled value (e.g., signal 559) computed in step S652. If the value computed in step S646 equals or exceeds the value computed in step S652, then a positive delay correlation detection indicator (e.g., signal 561) is output in step S656. If the value computed in step S646 does not exceed the value computed in step S652, then a negative delay correlation detection indicator (e.g., signal 561) is output in step S655. As shown by step S658, the process may then return to step S606 of FIG. 14A.

Considering the situation of Combination II, when the channel bandwidths for a given FFT size for which the preamble is searched are close enough, the effect of interference from adjacent channel is reduced. Therefore, decimation and filtering can be avoided. For example, the preamble search for an 1024 FFT size with the channel bandwidths of 10 MHz and 8.75 MHz, the effect of interference from adjacent channels for the 8.75 MHz case will be less, as the channel bandwidths 10 MHz and 8.75 MHz are relatively close. Alternatively, in case of channel bandwidths that are not sufficiently close to avoid interference, the decimation and filtering can be done with additional computation to reduce the interference from the adjacent channels.

Combination III

Figure 15:
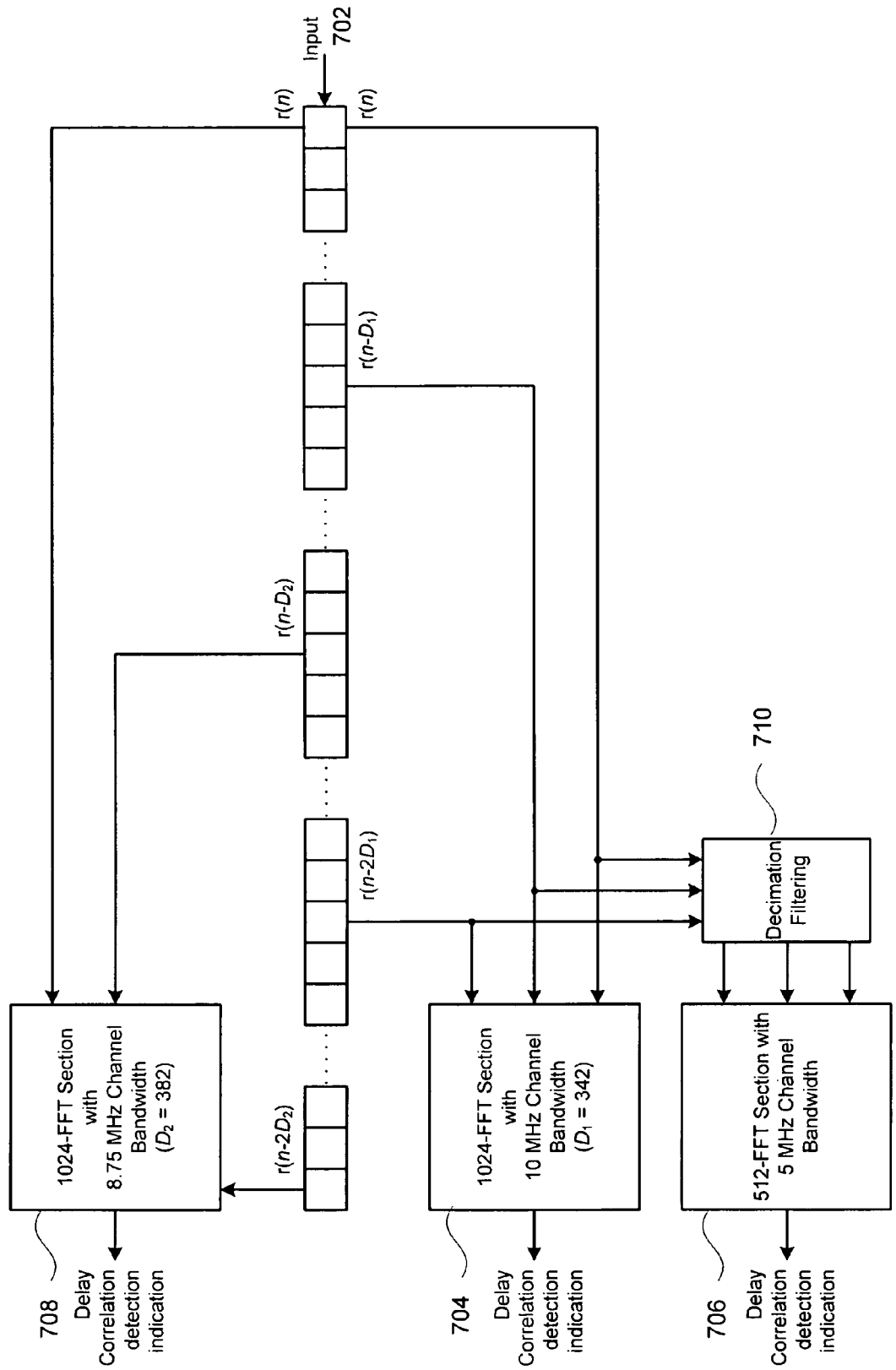
FIG. 15 illustrates another parallel sliding window correlator structure in accordance with aspects of the present invention.

FIG. 15 shows an example in accordance with other aspects of the present invention for a parallel preamble search. This example refers back to preambles searched in the examples of Combination I and Combination II above. In the present example, three preambles can be searched in parallel with different channel bandwidths and associated FFT sizes. The three preambles searched are, by way of example only, a 1024 FFT size with 10 MHz channel bandwidth, a 1024 FFT size with 8.75 MHz channel bandwidth, and a 512 FFT size with 5 MHz channel bandwidth. The exemplary signal being captured to search the preambles is 10 MHz wide and sampled at 11.2 MHz.

FIG. 15 illustrates a hybrid system 700 which desirably incorporates the structures of FIGS. 11 and 13. Here, delay line 702 provides data to a first FFT section 704, a second FFT section 706 and a third FFT section 708. As shown in this example, the FFT section 704 may search for a 1024 FFT size for a 10 MHz channel bandwidth where the distance between repeating sections is $D_1$. The FFT section 706 may search for a 512 FFT size for a 5 MHz channel bandwidth. And the FFT section 708 may search for a 1024 FFT size with an 8.75 MHz channel bandwidth where the distance between repeating sections is $D_2$.

In an example, the FFT section 704 employs the same structure as that of FFT section 504 of FIG. 13. Similarly, the FFT section 708 may employ the same structure as that of FFT section 506 of FIG. 13. And FFT section 706 may employ the same structure as that of N/2 FFT section 306 of FIG. 11, where in the present example filtering may be performed with decimation filter section 710 as illustrated in FIG. 15.

Figure 17:
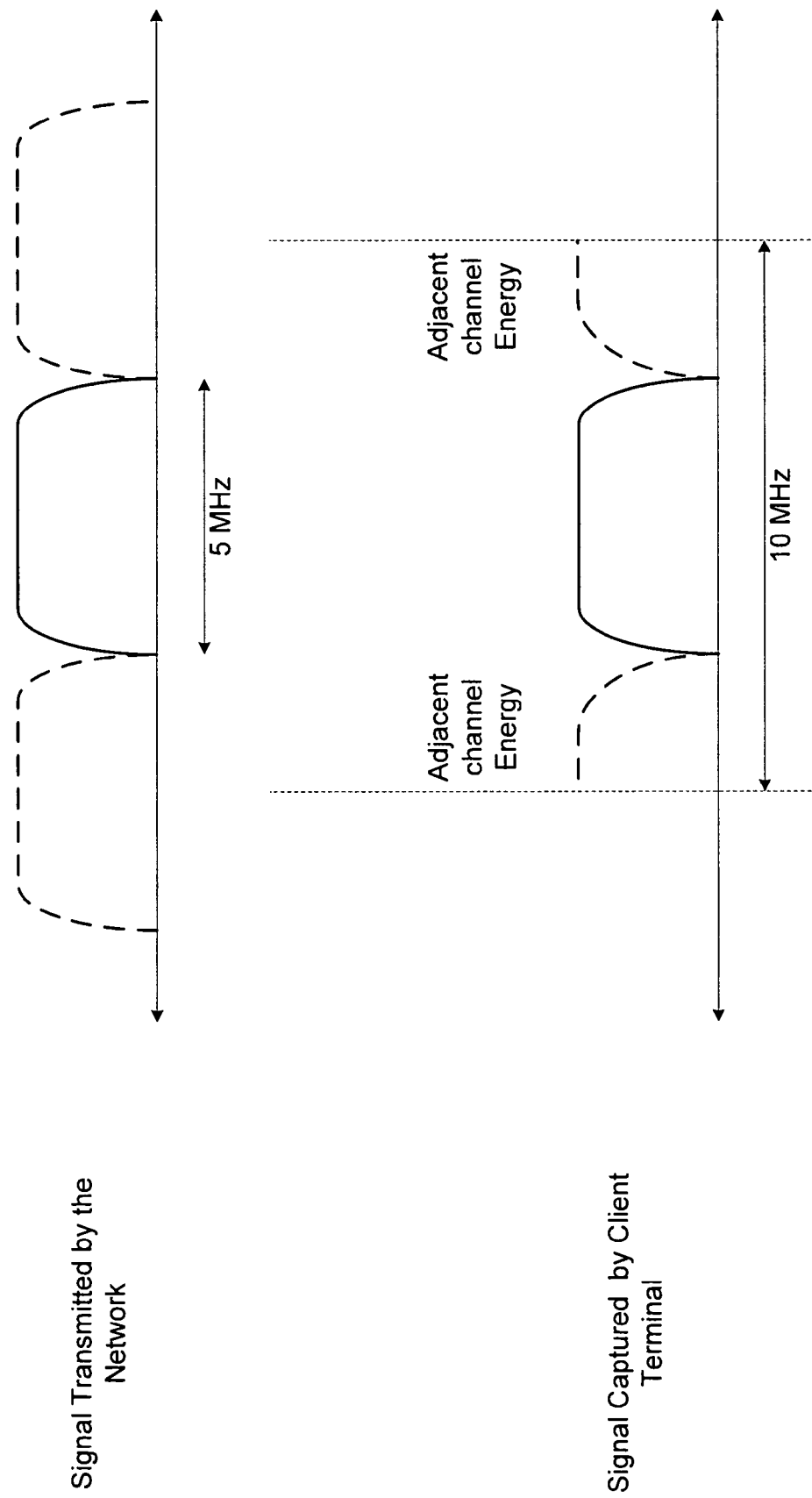
FIG. 17 illustrates transmitted and received signals in a wireless system.

The RF receive chain of a client terminal/mobile station in accordance with aspects of the present invention may be configured for the widest of the two or more channel bandwidths being considered. For example, if the mobile station is searching for a preamble of wireless communication networks having 10 MHz and 5 MHz channel bandwidths, the RF receive chain is desirably programmed to accommodate a 10 MHz bandwidth. It is possible that the actual channel bandwidth being used by the network is smaller than the channel bandwidth programmed by the mobile station's RF receive chain. In this case, as shown in FIG. 17, the received signal data at the mobile station will have energy from adjacent channels (dashed lines) in addition to the energy from the desired channel (solid lines).

The energy from the adjacent channels may act as interference and may degrade the preamble detection performance. This problem of signal energy from adjacent channels is mitigated by the low pass frequency response of a decimation filter which rejects some of the energy from adjacent channel signals. Furthermore, during the correlation process the interfering signals advantageously combine destructively while the actual preamble signal combines constructively. Therefore, it is possible to detect the preamble even without the filtering interference signals from adjacent channels. The thresholds for the preamble detection indication are adjusted according to different scenarios as follows.

For the exemplary case of a parallel preamble search of 1024 FFT size with 8.75 MHz and 10 MHz channel bandwidths, the energy computed for normalization will be higher for the preamble search section corresponding to a 8.75 MHz channel bandwidth, as the wider bandwidth signal (10 MHz) is sampled. Therefore, the ratio of magnitude of correlation to the signal energy is smaller. Hence, the estimated energy for the 8.75 MHz channel bandwidth should be compensated by a factor that is proportional to the ratio of the channel bandwidths.

The energy computation may be separately done for each section of the parallel preamble sliding window correlator. For the example in FIG. 13, the energy computation is desirably done in squaring blocks and the accumulator ACC4 for the FFT section 506 and the energy computation is done in squaring blocks and accumulator ACC2 for the FFT section 504.

However, for the case of a parallel search without using any decimation filtering, the energy computation may be done in a single one of the sections and the other parallel sections may use this energy computation and scale it according to the bandwidth relationship, or the thresholds for preamble detection may be selected according to the bandwidth and FFT pair for which the section is searching the preamble. Such operation will eliminate or reduce the hardware requirements for the energy computation of one or more sections.

In accordance with aspects of the present invention, the sample data delay line (e.g., shift registers or circular buffers) may always be shared for all FFT sections. The multipliers, adders and conjugate blocks can be shared among all the FFT sections. Alternatively, each FFT section may have dedicated blocks for that section. In accordance with another aspect of the present invention, accumulators may be the only block that is unique to each section and that is not shared.

The thresholds used in the decision metrics can be configured dynamically based on the channel bandwidth and the FFT size being considered.

In accordance with another aspect of the present invention, each section may process the samples in parallel as they are received. The section that generates the strongest decision metric provides an indication of the preamble detection, bandwidth and the FFT size. Exemplary operation of parallel preamble correlator structures in accordance with aspects of the present invention have been described above for FIGS. 12A-C and 14A-C.

While the above discussions are specific to particular types of preambles, FFTs and channel bandwidth combinations, the same principles are applicable to any system where the synchronization signal exhibits some or all of the properties described herein.

The parallel sliding window correlator structure is illustrated for one section pair. However, this can be extended for two or more section pairs for better performance in accordance with aspects of the present invention.

In general, a preamble search may be performed under various scenarios including radio profile determination, timing and frequency synchronization. Once the radio profile is determined for a given wireless communication network, only the relevant section of the parallel preamble correlator need be used for timing and frequency synchronization while the rest of the parallel preamble correlator(s) is power down.

CP Correlation Detection Using a Parallel Sliding Window Correlator.

A preamble detection indication may be generated by the combination of the delay correlation detection indication and the CP correlation detection indication Alternatively, the preamble detection may be generated from delay correlation detection indication alone.

The above discussion herein has focused on using a parallel sliding window correlator structure for delay correlation detection. In order to enhance preamble detection, CP correlation detection may be used in addition to delay correlation detection. A parallel sliding window structure in accordance with aspects of the invention may be applied for CP correlation detection. To illustrate the application of the parallel sliding window structure for CP correlation detection, Combination II set forth above may be used as an example.

In this case, the example focuses on different channel bandwidths for the same FFT size. By way of example only, for an FFT size of 1024, channel bandwidths of 10 MHz, 8.75 MHz and 7 MHz can be searched in parallel. An exemplary parallel sliding window correlator structure 800 for searching two preambles for a FFT size of 1024 and any of the two channel bandwidth combinations, i.e. 10 MHz and 8.75 MHz, 10 MHz and 7 MHz and 8.75 MHz and 7 MHz is shown in FIG. 16.

Figure 16:
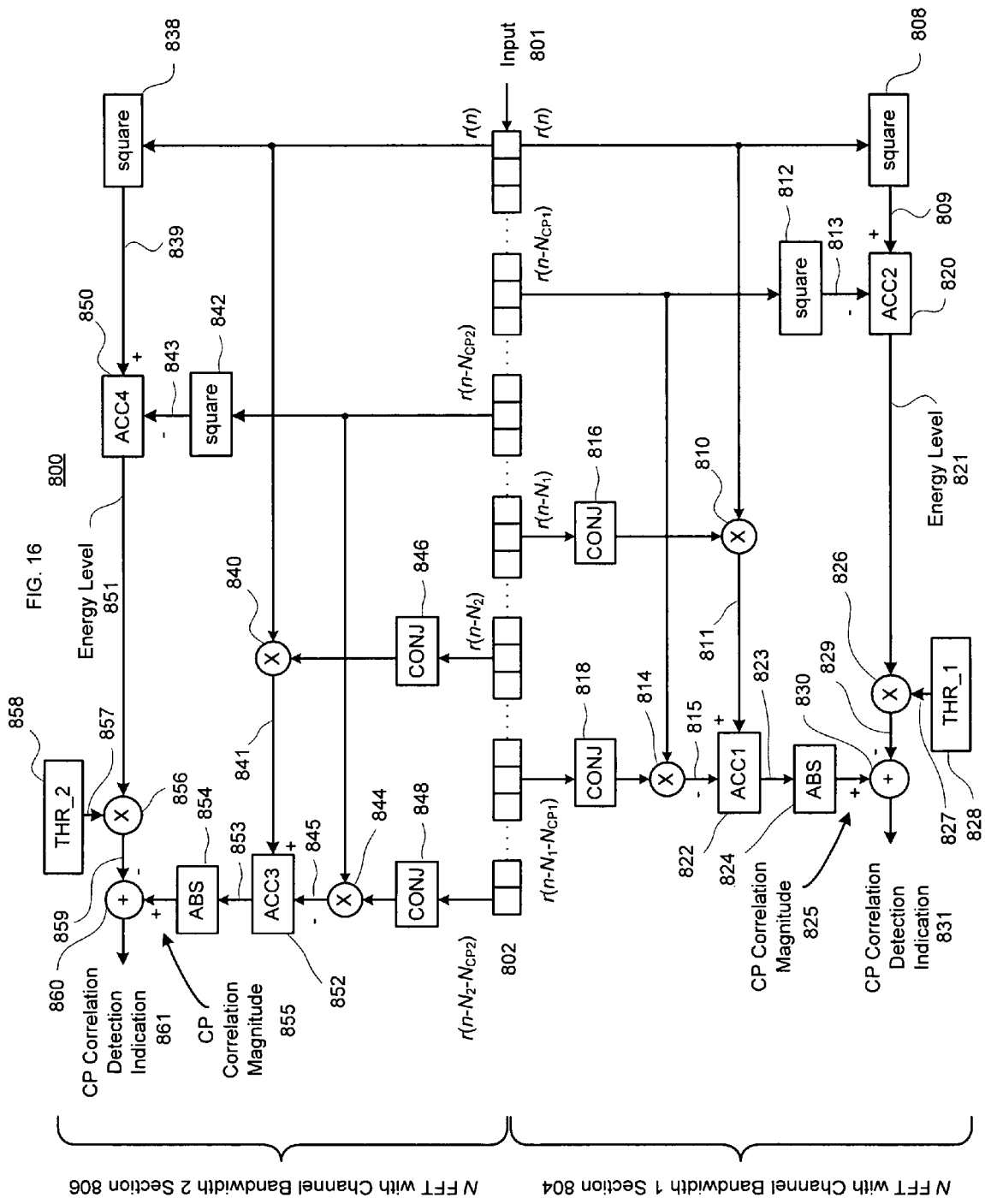
FIG. 16 illustrates yet another parallel sliding window correlator structure in accordance with aspects of the present invention.

As shown in FIG. 16, delay line 802 receives input samples 801, and various samples in the delay line are passed to two FFT sections 804 and 806. Turning to section 804, a first output, r(n), a second output, $r(n-N_{CP1})$, a third output $r(n-N_1)$ and a fourth output $r(n-N_1-N_{CP1})$ are utilized. The first output is provided to node 808 and to node 810. The second output is provided to node 812 and node 814. The third output is provided to node 816. And the fourth output is provided to node 818.

Node 808 squares the value of the first output, resulting in output signal 809. Node 812 squares the second output, resulting in output 813. At node 820 such as an accumulator, the signal 813 is subtracted from signal 809 and added it to the contents of the accumulator (e.g., ACC2) resulting in signal 821.

Node 810 multiplies the conjugate of the third output with the first output and issues signal 811. The signal 811 is provided to node 822.

At node 818 the conjugate of the fourth output is taken and is passed to node 814. This node multiplies the conjugate of the fourth output with the second output and issues signal 815. At node 822 such as an accumulator, the signal 815 is subtracted from signal 811 and results are added to the contents of the accumulator (e.g., ACC1) resulting in signal 823. Signal 823 is received by node 824, where the absolute value of the signal is taken. Resultant signal 825 is the CP Correlation Magnitude.

Signal 821, the Energy Level, is multiplied at node 826 with signal 827 from node 828. Signal 827 is a threshold value (e.g., THR_1) as described above. The result from node 826, namely signal 829, is subtracted from the CP Correlation Magnitude, signal 825, at node 830. The resultant output, signal 831, is the CP correlation detection indication for the N FFT section 804.

Turning to section 806, the first output, r(n), a fifth output, $r(n-N_{CP2})$, a sixth output $r(n-N_2)$ and a seventh output $r(n-N_2-N_{CP2})$ are utilized. The first output is provided to node 838 and to node 840. The fifth output is provided to node 842 and node 844. The sixth output is provided to node 846. And the seventh output is provided to node 848.

Node 838 squares the value of the first output, resulting in output signal 839. Node 842 squares the fifth output, resulting in output 843. At node 850 such as an accumulator, the signal 843 is subtracted from signal 839 and added it to the contents of the accumulator (e.g., ACC4) resulting in signal 851.

Node 840 multiplies the conjugate of the sixth output with the first output and issues signal 841. The signal 841 is provided to node 852.

At node 848 the conjugate of the seventh output is taken and is passed to node 844. This node multiplies the conjugate of the seventh output with the fifth output and issues signal 845. At node 852 such as an accumulator, the signal 845 is subtracted from signal 841 and results are added to the contents of the accumulator (e.g., ACC3) resulting in signal 853. Signal 853 is received by node 854, where the absolute value of the signal is taken. Resultant signal 855 is the CP Correlation Magnitude.

Signal 851, the Energy Level, is multiplied at node 856 with signal 857 from node 858. Signal 857 is a threshold value (e.g., THR_2) as described above. The result from node 856, namely signal 859, is subtracted from the CP Correlation Magnitude, signal 855, at node 860. The resultant output, signal 861, is the CP correlation detection indication for the N FFT section 806.

In the case searching for preambles having two different channel bandwidths (e.g., 10 MHz and 8.75 MHz) and the same FFT size (e.g., of 1024), the distance in samples between two CP sections will be 1024 samples when the 10 MHz channel bandwidth signaled is sampled at 11.2 MHz and the 8.75 MHz channel is sampled at 10 MHz. However, if the 8.75 MHz signal is sampled at 11.2 MHz rather than 10 MHz, the distance in samples between two repeating sections of 8.75 MHz signal will be approximately 1024*11.2/10≈1147 samples.

Therefore, performing CP Correlation between samples that are separated by 1024 samples when the sampling rate is 11.2 MHz can detect CP correlation with 10 MHz channel bandwidth and 1024 FFT while at the same time performing CP Correlation between samples that are separated by 1147 samples with the same sampling rate of 11.2 MHz can detect CP correlation with 8.75 MHz channel bandwidth and 1024 FFT size.

In the example of FIG. 16, for N FFT with the Channel Bandwidth 1 section, the FFT size may be 1024 and the channel bandwidth may be 10 MHz and for N FFT with the Channel Bandwidth 2 section, the FFT size may be 1024 and the channel bandwidth may be 8.75 MHz. For this example the CP length may be $\frac{1}{8}^{th}$ of FFT size. Furthermore, $N_1$ may be 1024 and $N_{CP1}$ may be 128; $N_2$ may be 1147 and $N_{CP2}$ may be 143.

This parallel sliding window correlator structure for CP correlation detection may be applied, for example, to Combination I and Combination III.

Also, a single parallel sliding window correlator structure may be used to perform both parallel delay correlation detection and parallel CP correlation detection at the same time.

Parallel sliding window structures in accordance with aspects of the present invention may provide the following benefits. Preamble search time may be significantly reduced. This improves network selection and early service availability. The less time the mobile station spends finding the appropriate network, the quicker a user may make or receive calls. Another benefit of structures in accordance with the present invention is a reduction in power consumption over conventional devices. This may be a significant advantage in many cases, particularly for battery operated client terminals/mobile stations. Preamble search processes in accordance with aspects of the invention and examples set forth herein may be initiated for a certain predetermined duration when required. The search process may stop once preamble detection has been successful. The search process may be repeated for certain number of times to validate a successful detected preamble or search for additional preambles. Furthermore, as the input signal (e.g., 301, 501, 801) may be complex in nature, so all the relevant nodes should be operable to handle complex signals.

Parallel sliding window correlators in accordance with aspects of the present invention may be implemented in one or more sections of a mobile station. By way of example only, such correlators may be implemented in a signal processing unit of the baseband subsystem. Alternatively, such architectures may be implemented as firmware in the MCU of the baseband subsystem. Configurable registers (e.g., THR_1, THR_2, filter coefficients, etc.) may be programmed by firmware executed by the MCU.

While a given parallel sliding windows correlator pair may operate at a first channel bandwidth (N) and a second channel bandwidth (N/2) which is half that of the first channel bandwidth, other alternatives includes situations where the first channel bandwidth is an integral multiple of the second channel bandwidth. Similarly, while the sampling rate for a first channel bandwidth may be double the rate for the second channel bandwidth, other alternatives include a sampling rate for the first channel bandwidth that is an integral multiple of a sampling rate of the second channel bandwidth.

It should be understood that while two parallel preamble searches are shown in many of the examples, there may be many other combinations with more than two preamble searches being performed in parallel. And depending on the channel bandwidth and FFT size, the delay line structure may be tapped at different points to feed into the various search sections.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Aspects of each embodiment may be employed in the other embodiments described herein.

For instance, various combinations of sliding window correlator structures may be implemented using some or all of the examples provided herein. Furthermore, while various processes have been shown in certain orders for ease of illustration, it should be understood that specific operations are not required to be performed in the exact order shown unless expressly stated herein.

The invention claimed is:

1. A mobile station having a parallel sliding window correlator apparatus for preamble searching in a wireless network, comprising:
   a delay line device for receiving an input signal representative of a received signal from the wireless network, the delay line device providing a plurality of outputs including a first output $r(n)$, a second output $r(n-D)$, a third output $r(n-2D)$, a first filtered output $r_2(m)$, a second filtered output $r_2(m-D/2)$ and a third filtered output $r_2(m-D)$;
   a first FFT section coupled to the delay line device and receiving the first output, the second output and the third output, the first FFT section including a plurality of nodes for processing the first, second and third outputs, a first one of the plurality of nodes of the first FFT section for obtaining a first correlation magnitude signal, a second one of the plurality of nodes for obtaining a first energy level signal corresponding to a first energy level of the received signal, a third one of the plurality of nodes for scaling the first energy level signal by a predetermined first threshold to obtain a first scaled signal, and a fourth one of the plurality of nodes for taking the difference between the first correlation magnitude signal and the first scaled signal to generate a first delay correlation detection indication signal; and
   a second FFT section coupled to the delay line device and receiving the first filtered output, the second filtered output and the third filtered output, the second FFT section including a plurality of nodes for processing the first, second and third filtered outputs, a first one of the plurality of nodes of the second FFT section for obtaining a second correlation magnitude signal, a second one of the plurality of nodes for obtaining a second energy level signal corresponding to a second energy level of the received signal, a third one of the plurality of nodes for scaling the second energy level signal by a predetermined second threshold to obtain a scaled signal, and a fourth one of the plurality of nodes for taking the difference between the second correlation magnitude signal and the second scaled signal to generate a second delay correlation detection indication signal;
   wherein the first FFT section is an N-size FFT section and the second FFT section is an N/2 size FFT section, the N-size FFT section searches for a first preamble associated with a first channel bandwidth and the N/2 size FFT section searches for a second preamble associated with a second channel bandwidth, and processing to obtain the first and second delay correlation detection indication signals is performed in parallel.

2. The mobile station of claim 1, wherein the first threshold corresponds to a ratio of the first correlation magnitude signal and the first energy level signal, and the second threshold corresponds to a ratio of the second correlation magnitude signal and the second energy level signal.

3. The mobile station of claim 1, wherein the first channel bandwidth is an integral multiple of the second channel bandwidth.

4. The mobile station of claim 3, wherein a sampling rate for the first channel bandwidth is an integral multiple of a sampling rate of the second channel bandwidth.

5. The mobile station of claim 1, wherein the delay line device includes a decimation filter to reduce a sampling rate or filter out unwanted signals to generate the first, second and third filtered outputs.

6. The mobile station of claim 5, wherein coefficients of the decimation filter are obtained dynamically depending on the first and second channel bandwidths and the sampling rate.

7. The mobile station of claim 1, wherein:
   the first FFT section further includes nodes for squaring the first and second outputs and the second node of the first FFT section subtracts the squared second output from the squared first output; and
   the second FFT section further includes nodes for squaring the first and second filtered outputs and the second node of the second FFT section subtracts the squared second filtered output from the squared first filtered output.

8. The mobile station of claim 7, wherein:
   the first FFT section further includes a fifth node for multiplying the first output with a conjugate of the second output, a sixth node for multiplying the second output with a conjugate of the third output, and a seventh node for subtracting a signal received from the sixth node from a signal received from the fifth node and outputting a first resultant signal; and
   the second FFT section further includes a fifth node for multiplying the first filtered output with a conjugate of the second filtered output, a sixth node for multiplying the second filtered output with a conjugate of the third filtered output, and a seventh node for subtracting a signal received from the sixth node from a signal received from the fifth node and for outputting a second resultant signal.

9. The mobile station of claim 8, wherein the first correlation magnitude is obtained by taking an absolute value of the first resultant signal and the second correlation magnitude is obtained by taking an absolute value of the second resultant signal.

10. A mobile station having a parallel sliding window correlator apparatus for preamble searching in a wireless network, comprising:
a delay line device for receiving an input signal representative of a received signal from the wireless network, the delay line device providing a plurality of outputs including a first output r(n), a second output r(n−$D_1$), a third output r(n−$2D_1$), a fourth output r(n−$D_2$) and a fifth output r(n−$2D_2$), wherein $D_1$ is a first distance between repeating sections of the input signal and $D_2$ is a second distance between repeating sections of the input signal;
a first FFT section coupled to the delay line device and receiving the first output, the second output and the third output, the first FFT section including a plurality of nodes for processing the first, second and third outputs, a first one of the plurality of nodes of the first FFT section for obtaining a first correlation magnitude signal, a second one of the plurality of nodes for obtaining a first energy level signal corresponding to a first energy level of the received signal, a third one of the plurality of nodes for scaling the first energy level signal by a predetermined first threshold to obtain a first scaled signal, and a fourth one of the plurality of nodes for taking the difference between the first correlation magnitude signal and the first scaled signal to generate a first delay correlation detection indication signal; and
a second FFT section coupled to the delay line device and receiving the first output, the fourth output and the fifth output, the second FFT section including a plurality of nodes for processing the first, fourth and fifth outputs, a first one of the plurality of nodes of the second FFT section for obtaining a second correlation magnitude signal, a second one of the plurality of nodes for obtaining a second energy level signal corresponding to a second energy level of the received signal, a third one of the plurality of nodes for scaling the second energy level signal by a predetermined second threshold to obtain a scaled signal, and a fourth one of the plurality of nodes for taking the difference between the second correlation magnitude signal and the second scaled signal to generate a second delay correlation detection indication signal;
wherein the first FFT section is an N-size FFT section and the second FFT section is also an N-size FFT section, the first FFT section searches for a first preamble associated with a first channel bandwidth and the second FFT section searches for a second preamble associated with a second channel bandwidth, and processing to obtain the first and second delay correlation detection indication signals is performed in parallel.

11. The mobile station of claim 10, wherein:
the first FFT section further includes nodes for squaring the first and second outputs and the second node of the first FFT section subtracts the squared second output from the squared first output; and
the second FFT section further includes nodes for squaring the first and fourth outputs and the second node of the second FFT section subtracts the squared fourth output from the squared first output.

12. The mobile station of claim 11, wherein:
the first FFT section further includes a fifth node for multiplying the first output with a conjugate of the second output, a sixth node for multiplying the second output with a conjugate of the third output, and a seventh node for subtracting a signal received from the sixth node from a signal received from the fifth node and outputting a first resultant signal; and
the second FFT section further includes a fifth node for multiplying the first output with a conjugate of the fourth output, a sixth node for multiplying the fourth output with a conjugate of the fifth output, and a seventh node for subtracting a signal received from the sixth node from a signal received from the fifth node and for outputting a second resultant signal.

13. The mobile station of claim 12, wherein the first correlation magnitude is obtained by taking an absolute value of the first resultant signal and the second correlation magnitude is obtained by taking an absolute value of the second resultant signal.

14. A mobile station having a parallel sliding window correlator apparatus for preamble searching in a wireless network, comprising:
delay means for receiving an input signal representative of a received signal from the wireless network and for providing a plurality of outputs;
first FFT means operatively coupled to the delay means for obtaining a first correlation magnitude signal, for obtaining a first energy level signal corresponding to a first energy level of the received signal, for scaling the first energy level signal by a predetermined first threshold to obtain a first scaled signal, and for taking the difference between the first correlation magnitude signal and the first scaled signal to generate a first delay correlation detection indication signal; and
second FFT means operatively coupled to the delay means for obtaining a second correlation magnitude signal, for obtaining a second energy level signal corresponding to a second energy level of the received signal, for scaling the second energy level signal by a predetermined second threshold to obtain a second scaled signal, and for taking the difference between the second correlation magnitude signal and the second scaled signal to generate a second delay correlation detection indication signal;
wherein the first FFT means searches for a first preamble associated with a first channel bandwidth and the second FFT means searches for a second preamble associated with a second channel bandwidth, and the first and second FFT means operate in parallel.

15. The mobile station of claim 14, wherein the first FFT means operates on an N-size FFT and the second FFT means operates on an N/2 size FFT.

16. The mobile station of claim 14, wherein the first FFT means operates on an N-size FFT and the second FFT means operates on the N-size FFT.

17. The mobile station of claim 14, further comprising:
third FFT means operatively coupled to the delay means for obtaining a third correlation magnitude signal, for obtaining a third energy level signal corresponding to a third energy level of the received signal, for scaling the third energy level signal by a predetermined third threshold to obtain a third scaled signal, and for taking the difference between the third correlation magnitude signal and the third scaled signal to generate a third delay correlation detection indication signal;
wherein the third FFT means operates in parallel with the first and second FFT means.

18. The mobile station of claim 17, wherein the first FFT means operates on a first distance between repeating sections of the input signal, the second FFT means operates on a second distance between repeating sections of the input signal, and the third FFT means operates on decimated and filtered versions of the input signal.

19. A mobile station having a sliding window correlator apparatus for preamble searching in a wireless network, comprising:
a delay line device for receiving an input signal representative of a received signal from the wireless network, the delay line device providing a plurality of outputs including a first output r(n), a second output $r(n-N_{cp1})$, a third output $r(n-N_1)$, a fourth output $r(n-N_1-N_{CP1})$, a fifth output $r(n-N_{CP2})$, a sixth output $r(n-N_2)$ and a seventh output $r(n-N_2-N_{CP2})$ wherein $N_1$ is a first distance between repeating sections of the input signal and $N_2$ is a second distance between repeating sections of the input signal;
a first FFT section coupled to the delay line device and receiving the first output, the second output, the third output and the fourth output, the first FFT section including a plurality of nodes for processing the first, second, third and fourth output signals, a first one of the plurality of nodes of the first FFT section for obtaining a first correlation magnitude signal, a second one of the plurality of nodes for obtaining a first energy level signal corresponding to a first energy level of the received signal, a third one of the plurality of nodes for scaling the first energy level signal by a predetermined first threshold to obtain a first scaled signal, and a fourth one of the plurality of nodes for taking the difference between the first correlation magnitude signal and the first scaled signal to generate a first CP correlation detection indication signal; and
the second FFT section including a plurality of nodes for processing the first, fifth, sixth and seventh outputs, a first one of the plurality of nodes of the second FFT section for obtaining a second correlation magnitude signal, a second one of the plurality of nodes for obtaining a second energy level signal corresponding to a second energy level of the received signal, a third one of the plurality of nodes for scaling the second energy level signal by a predetermined second threshold to obtain a second scaled signal, and a fourth one of the plurality of nodes for taking the difference between the second correlation magnitude signal and the second scaled signal to generate a second CP correlation detection indication signal; and
wherein the first FFT section is an N-size FFT section and the second FFT section is also an N-size FFT section, the first FFT section searches for a first preamble associated with a first channel bandwidth and the second FFT section searches for a second preamble associated with a second channel bandwidth, and processing to obtain the first and second delay correlation detection indication signals is performed in parallel.

20. The mobile station of claim 19, wherein:
the first FFT section further includes nodes for squaring the first and second outputs and the second node of the first FFT section subtracts the squared second output from the squared first output; and
the second FFT section further includes nodes for squaring the first and fifth outputs and the second node of the second FFT section subtracts the squared fifth output from the squared first output.

21. The mobile station of claim 20, wherein:
the first FFT section further includes a fifth node for multiplying the first output with a conjugate of the third output, a sixth node for multiplying the second output with a conjugate of the fourth output, and a seventh node for subtracting a signal received from the sixth node from a signal received from the fifth node and outputting a first resultant signal; and
the second FFT section further includes a fifth node for multiplying the first output with a conjugate of the sixth output, a sixth node for multiplying the fifth output with a conjugate of the seventh output, and a seventh node for subtracting a signal received from the sixth node from a signal received from the fifth node and outputting a second resultant signal.

22. The mobile station of claim 21, wherein the first correlation magnitude is obtained by taking an absolute value of the first resultant signal and the second correlation magnitude is obtained by taking an absolute value of the second resultant signal.

23. A method of preamble searching by a mobile station in a wireless network, the method comprising:
in a first processing section of the mobile station:
generating a first correlation magnitude signal;
generating a first energy level signal corresponding to a first energy level of the received signal;
scaling the first energy level signal by a predetermined first threshold to obtain a first scaled signal; and
generating a first delay correlation detection indication signal by taking the difference between the first correlation magnitude signal and the first scaled signal;
in a second processing section of the mobile station:
generating a second correlation magnitude signal;
generating a second energy level signal corresponding to a second energy level of the received signal;
scaling the second energy level signal by a predetermined second threshold to obtain a second scaled signal; and
generating a second delay correlation detection indication signal by taking the difference between the second correlation magnitude signal and the second scaled signal;
wherein the first processing section searches for a first preamble associated with a first channel bandwidth and the second processing section searches for a second preamble associated with a second channel bandwidth, and wherein the first and second processing sections operate in parallel.

24. The method of claim 23, wherein the first processing section operates on an N-size FFT and the second processing section operates on an N/2 size FFT.

25. The method of claim 23, wherein the first processing section operates on an N-size FFT and the second processing section operates on the N-size size FFT.

26. The method of claim 23, further comprising:
receiving an input signal representative of a received signal from the wireless network in a delay line device;
the delay line device providing a plurality of outputs based upon the received input signal, including a first output r(n), a second output r(n−D), a third output r(n−2D), a first filtered output $r_2(m)$, a second filtered output $r_2(m-D/2)$ and a third filtered output $r_2(m-D)$;
in the first processing section, obtaining the first energy level signal by squaring the first and second outputs and taking the difference between the squares of the first and second outputs;
in the second processing section, obtaining the second energy level signal by squaring the first and second filtered outputs and taking the difference between the squares of the first and second outputs;

in the first processing section, obtaining the first correlation magnitude signal by:
  multiplying the first output by a conjugate of the second output to obtain a first multiplied signal;
  multiplying the second output by a conjugate of the third output to obtain a second multiplied signal; and
  subtracting the second multiplied signal from the first multiplied signal;
in the second processing section, obtaining the second correlation magnitude signal by:
  multiplying the first filtered output by a conjugate of the second filtered output to obtain a first multiplied signal;
  multiplying the second filtered output by a conjugate of the third filtered output to obtain a second multiplied signal; and
  subtracting the second multiplied signal from the first multiplied signal.

27. The method of claim 26, further comprising:
scaling the first energy level signal by a first predetermined threshold value;
scaling the second energy level signal by second a predetermined threshold value;
if the first correlation magnitude signal is greater than or equal to the scaled first energy level signal, then outputting a positive first delay correlation detection indication signal;
if the first correlation magnitude signal is less then the scaled first energy level signal, then outputting a negative first delay correlation detection indication signal;
if the second correlation magnitude signal is greater than or equal to the scaled second energy level signal, then outputting a positive second delay correlation detection indication signal; and
if the second correlation magnitude signal is less then the scaled second energy level signal, then outputting a negative second delay correlation detection indication signal.

28. The method of claim 23, further comprising:
receiving an input signal representative of a received signal from the wireless network in a delay line device;
the delay line device providing a plurality of outputs based upon the received input signal, including a first output $r(n)$, a second output $r(n-D_1)$, a third output $r(n-2D_1)$, a fourth output $r(n-D_2)$ and a fifth output $r(n-2D_2)$;
in the first processing section, obtaining the first energy level signal by squaring the first and second outputs and taking the difference between the squares of the first and second outputs;
in the second processing section, obtaining the second energy level signal by squaring the first and fourth outputs and taking the difference between the squares of the first and fourth outputs;
in the first processing section, obtaining the first correlation magnitude signal by:
  multiplying the first output by a conjugate of the second output to obtain a first multiplied signal;
  multiplying the second output by a conjugate of the third output to obtain a second multiplied signal; and
  subtracting the second multiplied signal from the first multiplied signal;
in the second processing section, obtaining the second correlation magnitude signal by:
  multiplying the first output by a conjugate of the fourth output to obtain a first multiplied signal;
  multiplying the fourth output by a conjugate of the fifth output to obtain a second multiplied signal; and
  subtracting the second multiplied signal from the first multiplied signal.

29. The method of claim 28, further comprising:
scaling the first energy level signal by a first predetermined threshold value;
scaling the second energy level signal by second a predetermined threshold value;
if the first correlation magnitude signal is greater than or equal to the scaled first energy level signal, then outputting a positive first delay correlation detection indication signal;
if the first correlation magnitude signal is less then the scaled first energy level signal, then outputting a negative first delay correlation detection indication signal;
if the second correlation magnitude signal is greater than or equal to the scaled second energy level signal, then outputting a positive second delay correlation detection indication signal; and
if the second correlation magnitude signal is less then the scaled second energy level signal, then outputting a negative second delay correlation detection indication signal.

30. A method of preamble searching by a mobile station in a wireless network, the method comprising:
providing a delay line device for receiving an input signal representative of a received signal from the wireless network;
the delay line device generating a plurality of outputs including a first output $r(n)$, a second output $r(n-N_{cp1})$, a third output $r(n-N_1)$, a fourth output $r(n-N_1-N_{CP1})$, a fifth output $r(n-N_{CP2})$, a sixth output $r(n-N_2)$ and a seventh output $r(n-N_2-N_{CP2})$, wherein $N_1$ is a first distance between repeating sections of the input signal and $N_2$ is a second distance between repeating sections of the input signal;
receiving the first output, the second output, the third output and the fourth output at a first FFT section, the first FFT section:
  obtaining a first correlation magnitude signal;
  obtaining a first energy level signal corresponding to a first energy level of the received signal;
  scaling the first energy level signal by a predetermined first threshold to obtain a first scaled signal; and
  taking the difference between the first correlation magnitude signal and the first scaled signal to generate a first CP correlation detection indication signal;
receiving the first, fifth, sixth and seventh outputs at a second FFT section, the second FFT section:
  obtaining a second correlation magnitude signal;
  obtaining a second energy level signal corresponding to a first energy level of the received signal;
  scaling the second energy level signal by a predetermined second threshold to obtain a second scaled signal; and
  taking the difference between the second correlation magnitude signal and the second scaled signal to generate a second CP correlation detection indication signal.

31. The method of claim 30, wherein the first FFT section is an N-size FFT section and the second FFT section is also an N size FFT section, and the first FFT section searches for a first preamble associated with a first channel bandwidth and the second FFT section searches for a second preamble associated with a second channel bandwidth.

32. The method of claim 30, wherein the first and second FFT sections operate in parallel to generate the first and second CP correlation detection indication signals.

* * * * *

UNITED STATES PATENT AND TRADEMARK OFFICE
CERTIFICATE OF CORRECTION

PATENT NO. : 7,953,190 B2
APPLICATION NO. : 12/151114
DATED : May 31, 2011
INVENTOR(S) : Bhaskar Patel and Arumugam Govindswamy It is certified that error appears in the above-identified patent and that said Letters Patent is hereby corrected as shown below:

Title Pg, Item (57) ABSTRACT, Line 2, "which enables faster" should read -- which enable faster --.
Col. 1, Line 56, "referred as" should read -- referred to as --.
Col. 1, Line 64, "geographic area" should read -- geographic areas --.
Col. 1, Line 65, "radio profile" should read -- radio profiles --.
Col. 2, Line 8, "("OFDMA") based" should read -- ("OFDMA")-based --.
Col. 2, Line 38, "networks are" should read -- networks is --.
Col. 2, Line 60, "is searched" should read -- are searched --.
Col. 3, Line 11, "terminal roaming" should read -- terminal is roaming --.
Col. 4, Line 62, "device provide" should read -- device provides --.
Col. 5, Line 64, "delay mean" should read -- delay means --.
Col. 6, Line 44, "station having" should read -- station has --.
Col. 8, Line 41, "less then" should read -- less than --.
Col. 8, Line 47, "less then" should read -- less than --.
Col. 11, Line 42, "OFDMA based" should read -- OFDMA-based --.
Col. 11, Line 58, "OFDMA based" should read -- OFDMA-based --.
Col. 14, Line 48, "added it to" should read -- added to --.
Col. 15, Line 3, "added it to" should read -- added to --.
Col. 15, Line 45, "are different" should read -- is different --.
Col. 17, Line 19, "added it to" should read -- added to --.
Col. 17, Line 25, "added it to" should read -- added to --.
Col. 18, Line 54, "result" should read -- result is computed. --.
Col. 18, Line 56, "r(n-D)" should read -- r(n-D) is taken. --.
Col. 19, Line 35, "As shown at step S454," should read -- Step S454 shows --.
Col. 20, Line 42, "added it to" should read -- added to --.
Col. 20, Line 49, "added it to" should read -- added to --.
Col. 21, Line 9, "added it to" should read -- added to --.
Col. 21, Line 16, "added it to" should read -- added to --.
Col. 26, Line 55, "battery operated" should read -- battery-operated --.
Col. 27, Line 11, "includes" should read -- include --.

Signed and Sealed this
Nineteenth Day of June, 2012

David J. Kappos
*Director of the United States Patent and Trademark Office*

CERTIFICATE OF CORRECTION (continued)
U.S. Pat. No. 7,953,190 B2

Claim 25, Col. 32, Line 51, "N-size size FFT" should read -- N-size FFT --.
Claim 27, Col. 33, Line 22, "second a" should read -- a second --.
Claim 27, Col. 33, Line 28, "less then" should read -- less than --.
Claim 27, Col. 33, Line 34, "less then" should read -- less than --.
Claim 29, Col. 34, Line 6, "second a" should read -- a second --.
Claim 29, Col. 34, Line 11, "less then" should read -- less than --.
Claim 29, Col. 34, Line 18, "less then" should read -- less than --.
Claim 31, Col. 34, Line 57, "N size" should read -- N-size --.